United States Patent
Galpin et al.

(10) Patent No.: US 11,722,694 B2
(45) Date of Patent: Aug. 8, 2023

(54) METHOD AND APPARATUS FOR VIDEO ENCODING AND DECODING BASED ON A LINEAR MODEL RESPONSIVE TO NEIGHBORING SAMPLES

(71) Applicant: InterDigital VC Holdings, Inc., Wilmington, DE (US)

(72) Inventors: Franck Galpin, Cesson-Sevigne (FR); Tangi Poirier, Cesson-Sevigne (FR); Philippe Bordes, Cesson-Sevigne (FR); Fabrice Leleannec, Cesson-Sevigne (FR); Fabien Racape, Palo Alto, CA (US)

(73) Assignee: InterDigital VC Holdings, Inc., Wilmington, DE (US)

( * ) Notice: Subject to any disclaimer, the term of this patent is extended or adjusted under 35 U.S.C. 154(b) by 224 days.

(21) Appl. No.: 16/963,451

(22) PCT Filed: Jan. 25, 2019

(86) PCT No.: PCT/US2019/015104
§ 371 (c)(1),
(2) Date: Jul. 20, 2020

(87) PCT Pub. No.: WO2019/147910
PCT Pub. Date: Aug. 1, 2019

(65) Prior Publication Data
US 2021/0051342 A1     Feb. 18, 2021

(30) Foreign Application Priority Data

Jan. 26, 2018   (EP) ..................................... 18305073
Dec. 20, 2018   (EP) ..................................... 18306779

(51) Int. Cl.
*H04N 19/593* (2014.01)
*H04N 19/147* (2014.01)
(Continued)

(52) U.S. Cl.
CPC ......... *H04N 19/593* (2014.11); *H04N 19/147* (2014.11); *H04N 19/176* (2014.11); *H04N 19/186* (2014.11)

(58) Field of Classification Search
None
See application file for complete search history.

(56) References Cited

U.S. PATENT DOCUMENTS

2017/0150186 A1 *   5/2017  Zhang .................. H04N 19/625
2017/0339404 A1 *  11/2017  Panusopone ......... H04N 19/105
(Continued)

FOREIGN PATENT DOCUMENTS

JP        2019530345 A    10/2019
WO    WO 2016155641 A1  10/2016
(Continued)

OTHER PUBLICATIONS

Leleannec, et al., "Asymmetric Coding Units in QTBT", Joint Video Exploration Team of ITU-T SG 16 WP 3 and ISO/IEC JTC1/SC29/WG11, Document: JVET-D0064, 4th Meeting, Chengdu, China, Oct. 15, 2016, 8 pages.
(Continued)

*Primary Examiner* — Xiaolan Xu
(74) *Attorney, Agent, or Firm* — Condo Roccia Koptiw LLP

(57) ABSTRACT

Different implementations are described, particularly implementations for video encoding and decoding based on a linear model responsive to neighboring samples are presented. Accordingly, for a block being encoded or decoded in a picture, at least one spatial neighboring template is determined and at least one linear model parameter is determined based on reconstructed samples of the at least one spatial neighboring template. In a first embodiment, the number N of reconstructed samples corresponds to N=2k
(Continued)

with k chosen so that n is the maxim integer smaller than sum of the block width and block height. In a second embodiment, the an offset for the relative position of a first sample in the template among samples of a left, respectively top, neighboring line of the block is determined. In a third embodiment, the number of reconstructed samples is set to a higher number in the larger dimension of the block.

26 Claims, 12 Drawing Sheets

(51) Int. Cl.
  *H04N 19/176* (2014.01)
  *H04N 19/186* (2014.01)

(56) References Cited

U.S. PATENT DOCUMENTS

| | | | |
|---|---|---|---|
| 2017/0366818 A1 | 12/2017 | Zhang et al. | |
| 2018/0199062 A1* | 7/2018 | Zhang | H04N 19/96 |
| 2019/0200021 A1 | 6/2019 | Park et al. | |
| 2021/0136407 A1* | 5/2021 | Aono | H04N 19/55 |

FOREIGN PATENT DOCUMENTS

| WO | 2017091773 A1 | 6/2017 |
|---|---|---|
| WO | WO 2017091759 A1 | 6/2017 |
| WO | 2018056603 A1 | 3/2018 |

OTHER PUBLICATIONS

Gisquet, et al., "Border subsampling for LM mode", Joint Collaborative Team on Video Coding (JCT-VC) of ITU-T SG 16 WP 3 and ISO/IEC JTC 1/SC 29/WG 11, Document: JCTVC-I0187, 9th Meeting, Geneva, Switzerland, Apr. 27, 2012, 8 pages.

Chen, et al., "Algorithm Description of Joint Exploration Test Model 7 (JEM 7)", Joint Video Exploration Team (JVET) of ITU-T SG 16 WP3 and ISO/IEC JTC 1/SC 29/WG 11, Document: JVET-G1001-v1, 7th Meeting, Torino, Italy, Jul. 13, 2017, 50 pages.

Anonymous, "Reference software for ITU-T N.265 high efficiency coding", ITU-T Telecommunication Standardization Sector of ITU, Series H: Audiovisual and Multimedia Systems, Infrastructure of audiovisual services—Coding of moving video, H.265.2, Oct. 2014, 12 pages.

Kawamura, et al., "AHG5: CU based chroma intra prediction with reduced reference", Joint Collaborative Team on Video Coding (JCT-VC) of ITU-T SG 16 WP3 and ISO/IEC JTC 1/SC 29/WG 11, Document: JCTVC-M0412, 13th Meeting, Incheon, Korea, Apr. 18, 2013, 5 pages.

Anonymous, "BMS-2.0", retrieved from internet at https://vcgit.hhi.fraunhofer.de/jvet/VVCSofbware_BMS/tags/BMS-2.0, Dec. 21, 2018, 1 page.

* cited by examiner

METHOD AND APPARATUS FOR VIDEO ENCODING AND DECODING BASED ON A LINEAR MODEL RESPONSIVE TO NEIGHBORING SAMPLES

CROSS-REFERENCE TO RELATED APPLICATIONS

This application is a national stage entry under 35 U.S.C. § 371 of International Application PCT/US2019/015104, filed Jan. 25, 2019, which was published in accordance with PCT Article 21(2) on Aug. 1, 2019, in English, and which claims the benefit of European Patent Application No. 18305073.1, filed Jan. 26, 2018, and European Patent Application No. 18306779.2, filed Dec. 20, 2018.

TECHNICAL FIELD

At least one of the present embodiments generally relates to, e.g., a method or an apparatus for video encoding or decoding, and more particularly, to a method or an apparatus for determining, for the block being encoded or decoded, at least one linear model parameter based on reconstructed samples of an at least one spatial neighboring template.

BACKGROUND

The domain technical field of the one or more implementations is generally related to video compression. At least some embodiments relate to improving compression efficiency compared to existing video compression systems such as HEVC (HEVC refers to High Efficiency Video Coding, also known as H.265 and MPEG-H Part 2 described in "ITU-T H.265 Telecommunication standardization sector of ITU (10/2014), series H: audiovisual and multimedia systems, infrastructure of audiovisual services—coding of moving video, High efficiency video coding, Recommendation ITU-T H.265"), or compared to under development video compression systems such as VVC (Versatile Video Coding, a new standard being developed by JVET, the Joint Video Experts Team).

To achieve high compression efficiency, image and video coding schemes usually employ prediction, including motion vector prediction, and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transform, and prediction.

A recent addition to high compression technology includes a prediction model based on a linear modeling responsive to the neighborhood of the block being processed. In particular, some prediction parameters are computed, in the decoding process, based on samples located in a spatial neighborhood of the block being processed. Such spatial neighborhood contains already reconstructed picture samples and is called a template in the following. According to non-limiting examples, such prediction models with prediction parameters determined based on spatial neighborhood include the Cross-component linear model (CCLM), the Local Illumination Compensation (LIC), or the Bi-directional Optical flow (BIO). In the decoding process, some prediction parameters are determined based on some reconstructed picture samples, localized on the left and/or on the top of the block being processed. It is thus desirable to optimize the determining, for a block being encoded or decoded, of the at least one spatial neighboring template on which at least one linear model parameter is determined in order to provide an accurate linear model.

SUMMARY

The purpose of the invention is to overcome at least one of the disadvantages of the prior art. For this purpose, according to a general aspect of at least one embodiment, a method for video encoding is presented, comprising determining, for a block being encoded in a picture, at least one spatial neighboring template; determining, for the block being encoded, at least one linear model parameter based on reconstructed samples of the at least one spatial neighboring template; and encoding the block using a linear model based on the determined at least one linear model parameter; wherein determining at least one spatial neighboring template comprises determining a number n of reconstructed samples in the at least one spatial neighboring template corresponding to $n=2^k$ with k chosen so that n is the maximum integer smaller than the sum of the block width and block height.

According to another general aspect of at least one embodiment, a method for video decoding is presented, comprising determining, for a block being decoded, at least one spatial neighboring template; determining, for the block being decoded, at least one linear model parameter based on reconstructed samples of the at least one spatial neighboring template; and decoding the block using a linear model based on the determined at least one linear model parameter; wherein determining at least one spatial neighboring template comprises determining a number n of reconstructed samples in the at least one spatial neighboring template corresponding to $n=2^k$ with k chosen so that n is the maximum integer smaller than the sum of the block width and block height.

According to another general aspect of at least one embodiment, an apparatus for video encoding is presented comprising means for implementing any one of the embodiments of the encoding method.

According to another general aspect of at least one embodiment, an apparatus for video decoding is presented comprising means for implementing any one of the embodiments of the decoding method.

According to another general aspect of at least one embodiment, an apparatus for video encoding is provided, comprising one or more processors, and at least one memory. The one or more processors is configured to implement to any one of the embodiments of the encoding method.

According to another general aspect of at least one embodiment, an apparatus for video decoding is provided, comprising one or more processors and at least one memory. The one or more processors is configured to implement to any one of the embodiments of the decoding method.

According to another general aspect of at least one embodiment, an offset is determined for the relative position of a first sample among samples of a left neighboring line (column) of the block being encoded or decoded, or an offset is determined for the relative position of a first sample among samples a top neighboring line (row) of the block being encoded or decoded.

In case of the left neighboring column, the "relative position of a first sample" corresponds to the sample situated at upper/top position in the column among the reference samples in the column or corresponds to the sample situated at the lower/bottom position in the column among the reference samples in the column depending the scanning direction choice. Similarly, in case of the top neighboring row, the "relative position of a first sample" corresponds to the sample situated at the very left position in the row among the reference samples in the row or corresponds to the sample situated at the very right position in the row among the reference samples in the row depending the scanning direction choice.

According to another general aspect of at least one embodiment, the number of reconstructed samples of the at least one spatial neighboring template is set to a higher number of samples in the larger dimension of the block being encoded or decoded.

According to another general aspect of at least one embodiment, the at least one spatial neighboring template comprises samples among samples of a top neighboring line of the block being encoded or decoded, or among samples of a left neighboring line of the block being encoded or decoded. Preferably, samples of a top neighboring line or samples of a left neighboring line are sub-sampled. In a variant, samples of a top neighboring line or samples of a left neighboring line are sub-sampled starting from the offset.

According to a variant, the samples of the templates which have been reconstructed using one particular coding mode (e.g. intra mode, combined intra/inter mode, intra block copy mode, IPCM . . . ) or using one particular coding parameter (e.g. motion vector value, flag, etc. . . . ) are not considered and/or removed from the template.

According to another general aspect of at least one embodiment, the linear model is implicitly disabled, at the encoding or decoding, in case the reconstructed samples of a left neighboring line are not available, and the reconstructed samples of a top neighboring line are not available. In a variant, the linear model is implicitly disabled, at the encoding or decoding, in case the block width and block height are lower than a value.

According to a variant, the linear model is implicitly disabled if all the samples of the template have been reconstructed using one particular coding mode or using one particular coding parameter. In another variant, the linear model is implicitly disabled if the number of samples in the template which have been reconstructed using one particular coding mode or using one particular coding parameter is superior to a threshold.

According to another general aspect of at least one embodiment, at least one of said block width and block height is not equal to a power of two.

According to another general aspect of at least one embodiment, said block width and block height are not equal.

According to another general aspect of at least one embodiment, the linear model belongs to a set comprising cross-component linear mode, block based illumination compensation linear model, and bi-directional optical flow.

According to another general aspect of at least one embodiment, the at least one linear model parameter based on reconstructed samples of the at least one spatial neighboring template are obtained by minimizing a distortion between samples of the spatial neighboring template of the block being encoded or decoded and samples of the spatial neighboring template of a reference block of the block being encoded or decoded.

According to another general aspect of at least one embodiment, a non-transitory computer readable medium is presented containing data content generated according to the method or the apparatus of any of the preceding descriptions.

According to another general aspect of at least one embodiment, a signal is provided comprising video data generated according to the method or the apparatus of any of the preceding descriptions.

One or more of the present embodiments also provide a computer readable storage medium having stored thereon instructions for encoding or decoding video data according to any of the methods described above. The present embodiments also provide a computer readable storage medium having stored thereon a bitstream generated according to the methods described above. The present embodiments also provide a method and apparatus for transmitting the bitstream generated according to the methods described above. The present embodiments also provide a computer program product including instructions for performing any of the methods described.

DETAILED DESCRIPTION

It is to be understood that the figures and descriptions have been simplified to illustrate elements that are relevant for a clear understanding of the present principles, while eliminating, for purposes of clarity, many other elements found in typical encoding and/or decoding devices. It will be understood that, although the terms first and second may be used herein to describe various elements, these elements should not be limited by these terms. These terms are only used to distinguish one element from another.

The various embodiments are described with respect to the encoding/decoding of a picture. They may be applied to encode/decode a part of picture, such as a slice or a tile, or a whole sequence of pictures.

Various methods are described above, and each of the methods comprises one or more steps or actions for achieving the described method. Unless a specific order of steps or actions is required for proper operation of the method, the order and/or use of specific steps and/or actions may be modified or combined.

At least some embodiments relate to adapting the determining of samples of a neighboring template for deriving a linear model, for instance used in Local Illumination Compensation, to the new coding (prediction) modes. Although the present description is mainly based on LIC as linear model, the skilled in the art will easily extend the present principles to another linear model such as CCLM. Besides, although the present description is based on a linear model minimizing a distortion based on mean square error difference (MSE), at least some embodiment of the present principles also applies to linear model minimizing a distortion based on minimum and/or maximum among a set of differences between a predicted sample and a reference sample, or a distortion based on a median of differences between a predicted sample and a reference sample.

By the new coding (prediction) modes, one skilled in the art will considered the coding modes wherein the prediction samples are built using combination of non-square or non-rectangular blocks (e.g. Triangle) and/or spatially variable weighting (e.g. Multi-Hypothesis). It is thus desirable to adapt the selection of the top and left samples for LIC to such coding mode to provide an accurate LIC model.

In section 1, some limitations regarding the selection of reference samples used to derive the linear model parameters are disclosed.

In section 2, several embodiments of a modified method for determining reference samples used to derive the LIC parameters are disclosed. They can be extended to the determining of reference samples of CCLM and BIO.

In section 3, additional information and generic embodiments are disclosed.

1 LIMITATIONS REGARDING THE SELECTION OF REFERENCE SAMPLES USED TO DERIVE THE LINEAR MODEL PARAMETERS

Figure 2:
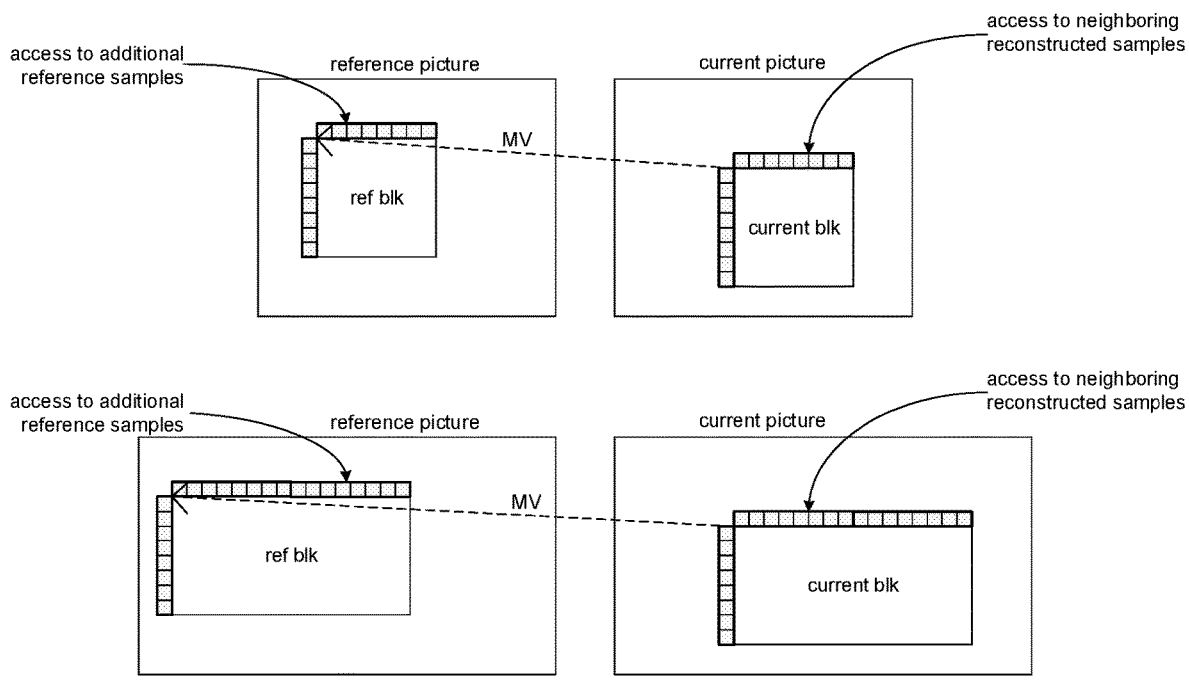
FIG. 2 illustrates the deriving of LIC parameters from neighboring reconstructed samples and the corresponding reference samples translated with motion vector for square and rectangular block in prior art.

1.1 Limitations Regarding the Selection of Reference Samples Used to Derive the LIC Parameters According to a first non-limiting example, a Local Illumination Compensation (LIC) based on a linear model is used to compensate for illumination changes between a picture being encoded and its reference pictures, using a scaling factor a and an offset b. It is enabled or disabled adaptively for each inter-mode coded coding unit (CU). When LIC applies for a CU, a mean square error (MSE) method is employed to derive the parameters a and b by using the neighbouring samples of the current CU and their corresponding reference samples. More specifically, the neighbouring samples of the CU (current blk on FIG. 2) and the corresponding samples (identified by motion information MV of the current CU or sub-CU or ref blk on FIG. 2) in the reference picture are used. The IC parameters are derived and applied for each prediction direction separately. The LIC parameters minimize the mean square error difference (MSE) between the top and left neighboring reconstructed samples rec_cur(r) of the current CU (access to neighboring reconstructed samples on the right of FIG. 2) and the top and left neighboring reconstructed samples rec_ref(s) of their corresponding reference samples determined by the inter prediction (access to additional reference samples on the left of FIG. 2), with s=r+MV, MV being a motion vector from inter prediction:

$$\text{dist} = \Sigma_{r \in Vcur, s \in Vref}(\text{rec\_cur}(r) - a \cdot \text{rec\_ref}(s) - b)^2 \quad \text{(eq 1)}$$

The value of (a,b) are obtained using a least square minimization (eq.2):

$$a = \left( \frac{\Sigma \, ref(s) \times cur(r) - \frac{\Sigma \, ref(s) \times \Sigma \, cur(r)}{N}}{\Sigma \, cur(r)^2 - \frac{\Sigma \, ref(s) \times \Sigma \, ref(s)}{N}} \right) \quad \text{(eq 2)}$$

$$b = \frac{\Sigma \, cur(r)}{N} - a \times \frac{\Sigma \, ref(s)}{N}$$

Once the LIC parameters are obtained by the encoder or the decoder for the current CU, then the prediction pred (current_block) of current CU consists in the following (uni-directional prediction case):

$$\text{pred(current\_block)} = a \times \text{ref\_block} + b \quad \text{(eq.3)}$$

Where current_block is the current block to predict, pred(current_block) is the prediction of the current block, and ref_block is the reference block built with regular motion compensation (MV) process and used for the temporal prediction of the current block.

The value of N, number of reference samples used in the derivation is adjusted (reduced incrementally) in order to the sum terms in eq.2 to remain below the maximum integer storage number value allowed (e.g. $N < 2^{16}$) or to cope with rectangular block. Accordingly, in a state-of-art approach, the reference samples are sub-sampled (with a sub-sampling step of stepH or stepV, horizontally and/or vertically) prior to be used for deriving LIC parameters (a,b) as illustrated on FIG. 3.

The set of neighboring reconstructed samples and the set of reference samples (see gray samples in FIG. 3) have the same number and same pattern. In the following, we will denote "left samples" the set of neighboring reconstructed (or the set of reference samples) situated at the left of the current block and denote "top samples" the set of neighboring reconstructed (or the set of reference samples) located at the top of the current block. We will denote "samples set" the one of "left samples" and "top-samples" sets. Preferably the "samples set" belongs to a left or top neighboring line of the block.

Some restrictions apply in the choice of the left and top samples (see gray samples in FIG. 3) used to derive the LIC parameters:

R1) The sum of left and top samples number should be a power of 2 so that the division is implemented using right shifting.

R2) The number of left ($N_L$) and top ($N_T$) samples is the same and is equal to Ns (N=2·Ns):

$$n=\min(cuHeight, cuWidth)$$

$$x=\log 2(n)$$

$$Ns=2^x \quad (eq.4)$$

R3) The step in between left (stepV) or top (stepH) samples is equal to:

$$stepV=cuHeight>>\log 2(Ns)$$

$$stepH=cuWidth>>\log 2(Ns) \quad (eq.5)$$

Figure 3:
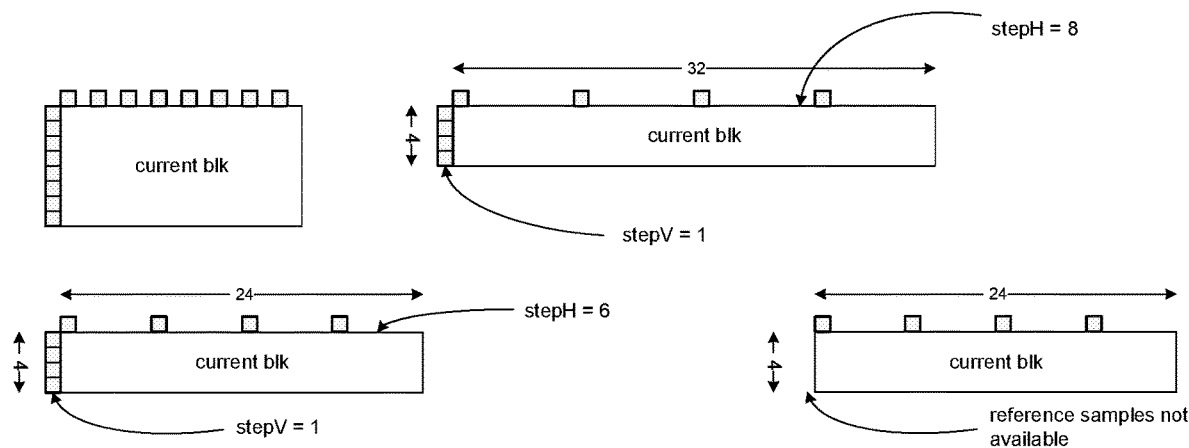
FIGS. 3, and 4 illustrate examples of position of left and top reference samples for rectangular CUs in prior art.

Accordingly, the inventors have recognized some limitations in the here-above presented state-of-art regarding the selection of reference samples used to derive the LIC parameters. These limitations are:

a) Samples Sets are Sub-Optimal in Case of Thin Rectangles (R3):

The "left-samples" and "top-samples" sets may be sub-optimal in case of rectangular CUs with unbalanced dimensions (width much larger than height or conversely) as depicted in FIG. 3. This is sub-optimal because the number of "top-samples" set used on top is very sparse compared to "left-samples" set, while the "left-samples" are farer to the current CU samples than "top-samples" in average, and consequently are a-priori less appropriate for estimating the local illumination change.

b) Samples Sets are Sub-Optimal in Case of Rectangular CUs where at Least One Sample Set is Unavailable:

The restriction R2 does not consider the case one (or two) reference samples boundary is unavailable. This may happen when the current CU (FIG. 2—right) or the reference CU (FIG. 2—left) is situated at the top or left picture (or slice or tile) border, as depicted in example in FIG. 3 at bottom-right. In this example, the choice of Ns is made from cuHeight=4, while left samples are unavailable. A better choice would have been Ns=16 for example.

In the case of CU at the top-left border, both "left-samples" and "top-samples" sets are un-available. In some codecs, the reconstructed samples are inferred to be equal to (1<<-bit-depth−1)) and reference samples are inferred by padding.

c) The Number of Samples May be Sub-Optimal for CU Sizes not Power of 2:

The R1 requirement is obtain through R2 but it adds un-necessary constraint since N is divisible by 4 because N=2·Ns and Ns=exp(log 2(n))=$2^x$.

Figure 4:
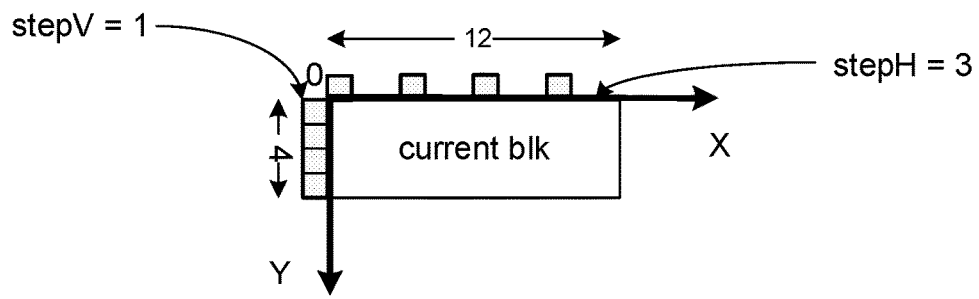

In the example of FIG. 4 which illustrates examples of position of left and top reference samples for a rectangular 12×4 CU, the rules lead to Ns=4 and N=8 whereas one could have better choose N=16 to avoid reference samples sparsity.

d) The Position of the Top-Left and Top-Right Samples are Sub-Optimal:

The position of the above-left (x=0; y=−1) and the upper-left (x=−1:y=0) samples are close, whatever the sub-sampling value (stepV and stepH).

Figure 5:
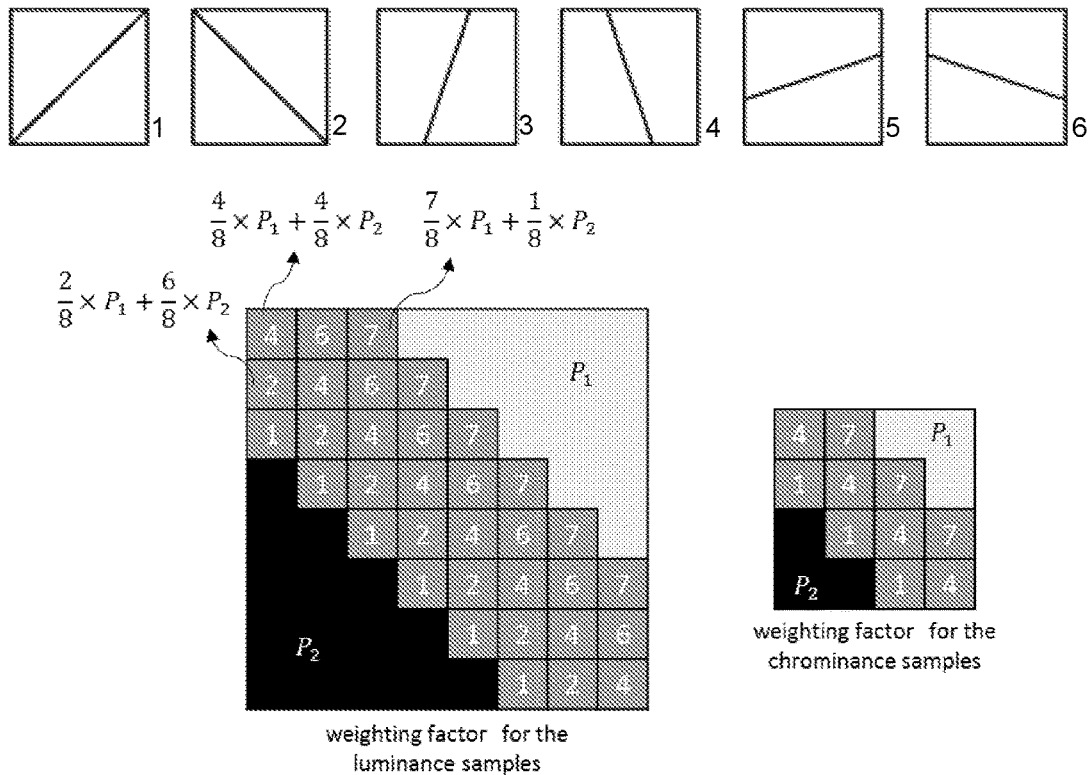
FIG. 5 illustrates examples of non-rectangular partitioning (top) and associated OBMC diagonal weighting (bottom) in prior art.

Whereas the position of the last above-right or last bottom-left samples may be relatively far to the very last right above sample (x=cuWidth−1; y=−1) (or very last bottom-left (x=−1; y=cuHeight−1) respectively) sample position of the current CU.

e) Samples Sets are Sub-Optimal in Case of Non-Rectangular PUs:

In case of non-rectangular predictions, the CU prediction is composed of two non-rectangular predictions (PU) as depicted in FIG. 5 example.

Figure 6:
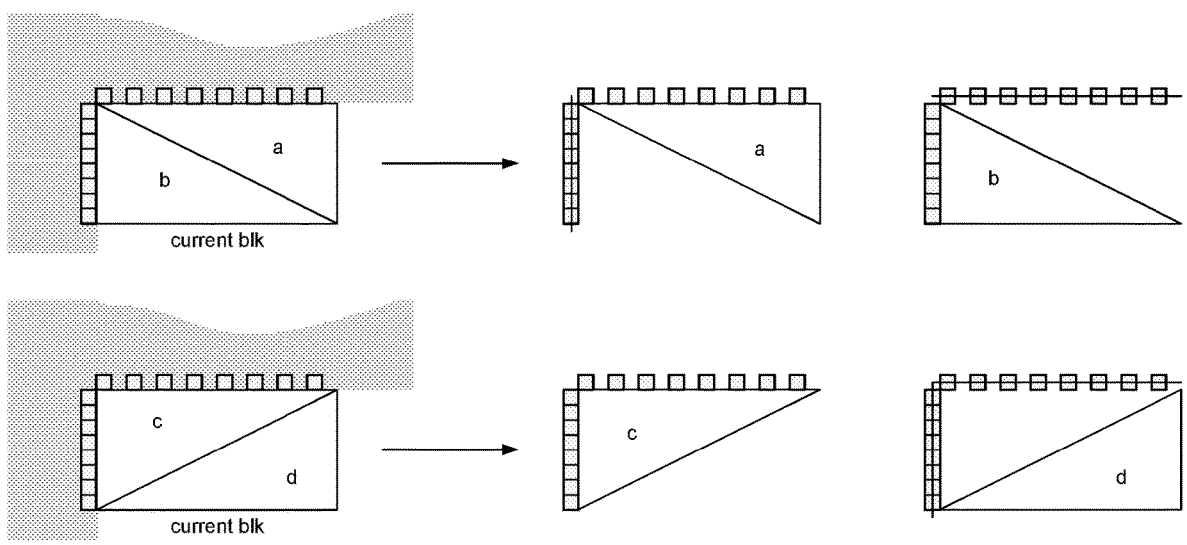
FIG. 6 illustrates examples of two triangular CU partitioning (left) and associated prediction unit pairs (right) in prior art.

It may happen the default position of the sample sets for the current CU are not suited to the associated PUs as depicted in FIG. 6 for triangular partitioning, because the sample sets may be far and not contiguous to the PU samples.

f) Samples Sets are Sub-Optimal in Case of MH:

In case of multi-hypothesis prediction, two regular predictions are combined together through weighted averaging. In case of one prediction mode intra and the other inter, the intra prediction mode is signaled (it can be a subset (e.g. 4) of classical prediction modes). In a variant, the current block is split into 4 equal-area regions. The weights gradually decrease as the region is far from the intra reference samples. Each weight set, denoted as (w0=w_intra$_i$, w1=w_inter$_i$), where i is from 1 to 4 and (w_intra$_1$, w_inter$_1$)= (6, 2), (w_intra$_2$, w_inter$_2$)=(5, 3), (w_intra$_3$, w_inter$_3$)=(3, 5), and (w_intra$_4$, w_inter$_4$)=(2, 6), will be applied to a corresponding region, as depicted in example of FIG. 7 for intra vertical direction prediction. In another variant, the weights are uniform over the CU but may be different for intra and inter (w_intra≠w_inter). When DC or planar mode is selected, or the CU width or height is smaller than 4, uniform weights are applied.

In these cases, the regions where the weights (w_inter) are low have less importance to the final prediction sample value in comparison to the other regions. Consequently, it may be inefficient to use the neighboring reference samples to these first regions to derive LIC parameters that will be used for the other regions where the inter prediction has higher weights.

In case of uniform weights, the LIC can be disabled if w_inter is below a threshold.

1.2 Limitations Regarding the Selection of Reference Samples Used to Derive the LM Parameters According to a second non-limiting example, to reduce the cross-component redundancy, a cross-component linear model (CCLM) prediction mode is used in the JEM, for which the chroma samples are predicted based on the reconstructed luma samples of the same CU by using a linear model as follows:

$$pred_c(i,j)=\alpha \cdot rec_L'(i,j)+\beta \quad (eq\ 6)$$

where $pred_c(i, j)$ represents the predicted chroma samples in a CU and $rec_L(i, j)$ represents the downsampled reconstructed luma samples of the same CU. Parameters α and β are derived by minimizing the regression error (means square error) between the neighbouring reconstructed luma and chroma samples around the current block as follows:

$$Error=\Sigma_{n \in N}(C(n)-\alpha \cdot L(n)-\beta)^2 \quad (eq\ 7)$$

Which is resolved by:

$$\alpha = \frac{N \cdot \Sigma(L(n) \cdot C(n)) - \Sigma L(n) \cdot \Sigma C(n)}{N \cdot \Sigma(L(n) \cdot L(n)) - \Sigma L(n) \cdot \Sigma L(n)} \quad (eq\ 8)$$

-continued $$\beta = \frac{\Sigma C(n) - \alpha \cdot \Sigma L(n)}{N} \quad \text{(eq 9)}$$

where L(n) represents the down-sampled top and left neighboring reconstructed luma samples, C(n) represents the top and left neighboring reconstructed chroma samples, and value of N is equal to twice of the minimum of width and height of the current chroma coding block. For a coding block with a square shape, the above two equations are applied directly. Accordingly, the limitations described for LIC also applies to LM.

1.3 Limitations Regarding the Selection of Reference Samples Used to Refine Inter-Prediction Yet another non-limiting example using linear model based on neighboring template described in a JEM version is the Bi-directional Optical flow (BIO) which provides sample-wise motion refinement performed on top of block-wise motion compensation for bi-prediction.

Accordingly, at least one embodiments improve the linear model process through a better choice (number, sub-sampling step, position) of the reference samples used for the derivation of the linear model (LIC, LM, BIO) parameters. This is achieved by making the choice of these samples dependent on the current CU geometry, coding mode and size as detailed in the following section.

2 AT LEAST ONE EMBODIMENT OF METHOD FOR DETERMINING REFERENCE SAMPLES USED TO DERIVE THE LIC PARAMETERS

In order to cope with the limitations presented in section 1, a general aspect of at least one embodiment aims to improve the accuracy of the linear model by determining an improved template among the reconstructed samples of the spatial neighboring used for deriving the linear model. The skilled in the art will appreciate that a block being encoded or decoded has zero or none available (for the first block of an image for instance) template, one available template (left or top image neighboring) or two available neighboring templates of reconstructed pixels (top and left templates). A spatial neighboring template comprises samples among a line of above neighboring samples of the block being processed, or samples among a line of left neighboring samples of the block being processed. In a first embodiment, the total number N of reconstructed samples of the at least one spatial neighboring template (i.e. in both left template and top template if both available) corresponds to $N=2^k$ with k chosen so that N is the maximum integer smaller than the sum of the block width and block height. In a second embodiment, an offset for the relative position of a first sample in the template among samples of a left (respectively top) neighboring line of the block being processed is determined. In a third embodiment, the number of reconstructed samples of the at least one spatial neighboring template is set to a higher number of samples in the larger dimension of the block being processed.

Those 3 embodiments and several other embodiments are described in section 2.1 to 2.7 for the non-limiting example of LIC parameters, the embodiments may be arranged together according to any combination of the various embodiments. In particular, the embodiments relative to the weight of top and left neighboring samples or relative to the samples offset are well adapted to linear model based on minimizing a maximum, a minimum (such as in an embodiment of CCLM or in another state-of-the art alternative embodiment of LIC) or a median value. Thus, the embodiment relative to the neighborhood weight can be implemented without the embodiment relative the number of samples in the template. Besides, the embodiment relative to the offset can be implemented without the embodiment relative the number of samples in the template.

Figure 1:
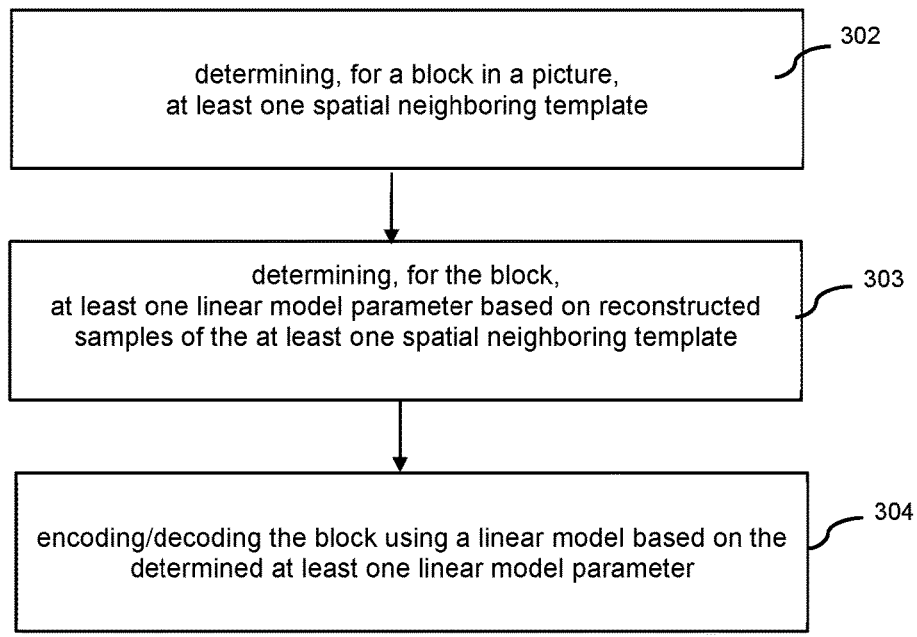
FIG. 1 illustrates an example encoding or decoding method comprising determination of a neighboring template used in linear model parameters derivation according to a general aspect of at least one embodiment.

FIG. 1 illustrates an example encoding or decoding method comprising determination of a neighboring template used in linear model parameters derivation according to a general aspect of at least one embodiment.

The encoding or decoding method 301 determines at least one linear model parameter based on reconstructed samples of at least one spatial neighboring template of the block being encoded or decoded. The linear model is then used in the encoding or decoding method. Such linear model parameter comprises for instance an affine coefficient of the model as defined in equation 3 or 6. Thus a linear model belongs to a set comprising cross-component linear model; block-based illumination compensation linear model; bi-directional optical flow.

First, at step 302, the method determines, for a block being processed in a picture, at least one spatial neighboring template according to any of the embodiments described hereafter.

At step 303, the method determines, for the block being processed, at least one linear model parameter based on reconstructed samples of the at least one spatial neighboring template. The linear model parameters based on reconstructed samples of the at least one spatial neighboring template are obtained by minimizing a distortion between samples of the spatial neighboring template of the block and samples of the spatial neighboring template of a reference block for the block as defined for instance in equation 1 or 7. The distortion is estimated by a MSE or any other method.

Finally, at step 304, the method encodes/decodes the block applying the linear model based on the determined at least one linear model parameter such as exposed for CCLM or LIC and responsive to the determined template.

Figure 8:
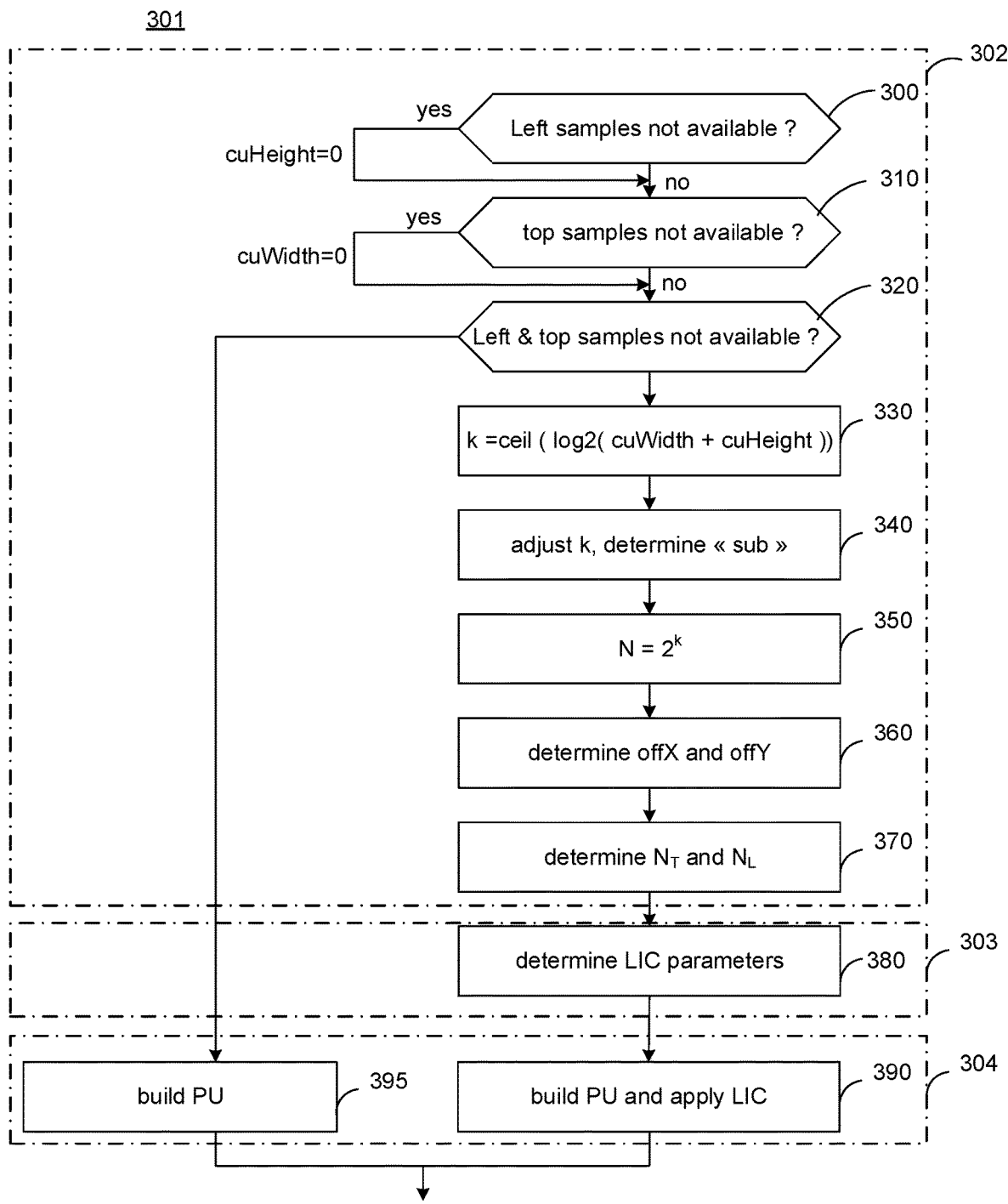
FIG. 8 illustrates an example encoding or decoding method comprising an optimized choice of the samples used in linear model parameters derivation according to a general aspect of at least one embodiment.

FIG. 8 illustrates another example encoding or decoding method comprising an optimized choice of the samples used in linear model parameters derivation according to a particular embodiment.

At step 302, the method determines, for a block being encoded or decoded in a picture, at least one spatial neighboring template. The embodiment of FIG. 8 combines the above discloses various embodiments. Any of the embodiments of sub-steps 300 to 370 for determining the template is optional and can be removed from the method 301 independently or processed in any order. The following variables are defined: cuHeight representing the height of the block being processed; cuWidth representing the width of the block being processed; the total number N of samples in the template with $N=2^k=N_L+N_T$ where $N_L$ and $N_T$ respectively represents the number of samples in the left and top templates; OffX and OffY respectively represents the relative offset of the first samples in the top and left templates in the top and left neighboring, the sub-sampling steps stepV, stepH are defined for the "left-samples" set and the last sample in the "top-samples" set.

In a sub-step 300, the availability of left samples is tested as discussed in section 2.4. In case left samples are not available, then the value cuHeight is set equal to zero cuHeight=0. Then in the following sub-steps, the value of N is set equal to $2^k$ with k=ceil (log 2(cuWidth)) and $N_T=N$, $N_L=0$. In a sub-step 310, the availability of top samples is tested as discussed in section 2.4. In case top samples are not available, then the value cuWidth is set equal to zero cuWidth=0. Then in the following sub-steps, the value of N is set equal to $2^k$ with k=ceil (log 2(cuHeight)) and $N_T$=0, $N_L$=N. In a sub-step 320, the availability of neither top and left samples is tested as discussed in section 2.5. In case both top and left samples are not available (or not enough samples in the neighboring are available), in 395, a linear model flag, enabling or disabling the prediction using linear model, is implicitly derived and set to false for the block and the method is ended for the block. In case at least one template is available, in the sub-steps 330, 340, 350 the number N of samples in the templates(s) is determined as detailed in section 2.1. Accordingly, in a sub-step 330, the value k is determined as k=ceil (log 2(cuWidth+cuHeight)), where ceil is the ceiling function, ceiling(x) returns the smallest integer greater than or equal to x. In sub-step 340, the sub-sampling value "sub" (distance between two samples in the same direction) is equal to 1. In a step 350, the value of N is set equal to $2^k$. Then in a sub-step 360, an offset (OffY for height and/or OffX for width) for the first sample among the neighboring samples is determined according to any of the variants detailed in section 2.2. In a sub-step 370, $N_L$ $N_T$ representing the number of samples in the left and top templates are adjusted (and sub-sampling step sub) so that more samples are selected in the larger size dimension as described in section 2.3. Thus, an improved template is determined for linear model derivation in step 302 according to this embodiment.

At step 303, the method determines, for the block being encoded or decoded, at least one linear model parameter based on reconstructed samples of the at least one spatial neighboring template. Finally, at step 304, the method encodes/decodes the block applying the linear model based on the determined at least one linear model parameter responsive to the determined template.

2.1 First Embodiment: Total Number of Samples N is Power of 2 but $N_L$ or $N_T$ are not Necessary Power of 2

The first embodiment comprises adapting the number N of samples used in LIC wherein N=$2^k$ with k chosen so that N is the maximum integer smaller than the sum of the block width and block height.

Advantageously, this embodiment allows to optimize samples sets in case of thin rectangles (case a) or for CU sizes not power of 2 (case c).

Accordingly, in a step 330, the value k is determined as:

k=ceil(log 2(cuWidth+cuHeight))

where cell is the ceiling function, ceiling(x) returns the smallest integer greater than or equal to x.

In step 340, the sub-sampling value "sub" (distance between two samples in the same direction) is equal to 1. In a step 350, the value of N is set equal to $2^k$. The embodiment is compatible with previous limitations and for instance, the value of k may be furtherly adjusted (reduced incrementally) and the value of "sub" is incremented accordingly 340 so that the sum terms in eq.2 remain below to the maximum integer storage number value allowed as explained before.

2.2 Second Embodiment: First Top or Left Samples are not (x=0; y=−1) and (x=−1;y=0)

The second embodiment comprises determining an offset for the relative position of the first sample in the "top-samples" set and/or determining an offset for the relative position of the first sample in the "left-samples" set.

Advantageously, this embodiment allows to optimize the position of the top-left and top-right samples (case d).

Figure 9:
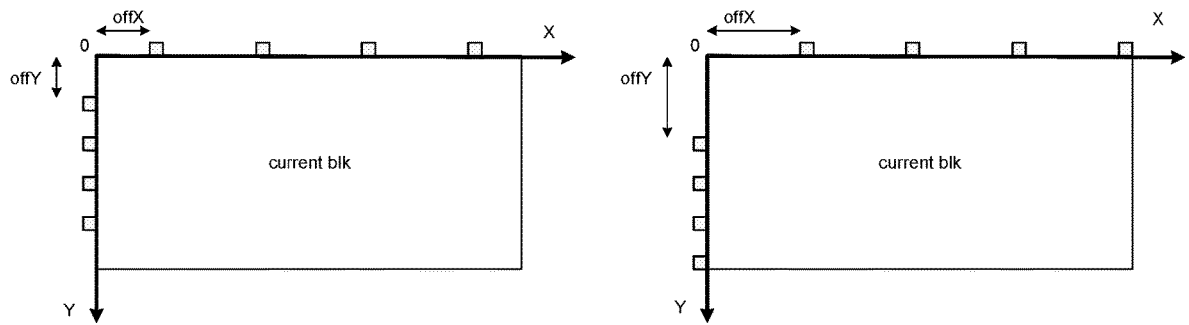
FIG. 9 illustrates an example of position of left and top reference samples for rectangular CUs with an offset according to a general aspect of at least one embodiment.

Accordingly, in a step 360, the position of the first sample in the "top-samples" set and the position of the first sample in the "left-samples" set are not zero but are moved with an offset (offX and offY respectively) as depicted in the left of FIG. 9.

In a variant, the position of the very last sample of the "top-samples" set is (x=cuWidth−1;y=−1) and the position of the very last "left-sample" set is (x=−1;y=cuHeight−1) as depicted in the right of FIG. 9.

In another variant, an offset for the position of the first sample in the "top-samples" set and the position of the first sample in the "left-samples" set and an offset for the position of the last sample in the "top-samples" set and the position of the last sample in the "left-samples" set are defined. Then, the sub-sampling steps (stepV, stepH) are defined responsive to the width between the first sample in the "top-samples" set and the last sample in the "top-samples" set, and to the height between the first sample in the "left-samples" set and last sample in the "left-samples" set.

In another variant, the value of "offX" (or "offY") is set equal to "stepH/2" (resp. "stepV/2").

In another variant, the values of "offX, offY" are the values which minimize the sum of the distance of the pixels of the current CU to the closer reference sample used for deriving LIC parameters:

$$(\textit{offX}, \textit{offY}) = \mathop{\text{arg min}}_{(\textit{offX}, \textit{offY})} \Sigma_{p \in CU} \textit{mindistref}(p) \qquad \text{(eq. 10)}$$

Where p is a sample of the CU and mindistref(p) is the distance of "p" to the closer reference sample Advantageously, the values (offX,offY) can be a-priori determined and tabulated for the set of possible CU sizes (cuWidth;cuHeight).

2.3 Third Embodiment: More Samples for the Larger Size Dimension

The third embodiment comprises selecting a higher number of samples in the larger dimension of the block.

Advantageously, this embodiment allows to optimize samples sets in case of rectangular CUs by introducing higher sample weight for the largest dimension.

Accordingly, in a step 370, for a given sub-sampling "sub" value, if A is the larger CU dimension (A=Left, $N_A$=$N_L$ or A=Top, $N_A$=$N_T$) and B is the other dimension, $N_A$ is computed as:

$N_A$=cuSizeA>>(sub−1)

$N_B$=N−$N_A$ (eq.11)

Where: cuSizeA=cuWidth if A=Top and cuSizeA=cuHeight if A=Left.

2.4 Fourth Embodiment: One Sample Set not Available

The fourth embodiment comprises adapting the number N of samples used in LIC wherein N=$2^k$ with k chosen so that N is the maximum integer smaller than block width in case the left-samples are available. The fourth embodiment comprises adapting the number N of samples used in LIC wherein $N=2^k$ with k chosen so that N is the maximum integer smaller than block height in case the top-samples are not available.

According to different variants, "samples not available" can cover the following cases:

Current CU is at the border of the picture or slice

Current CU is at the border of the pre-defined VPDU (Video Processing Data Unit) or the CTU. Where VPDU is the pre-defined maximal hardware processing unit size.

Advantageously, this embodiment allows to optimize samples sets in case of rectangular CUs where at least one sample set is unavailable (case d).

Accordingly in the method of FIG. 8, at least one additional test is introduced in 300 and 310 wherein the availability of samples is checked. In case left (300) or top (310) samples are not available, then the value of N is set equal to $2^k$ with k=ceil (log 2(cuWidth)) or k=ceil (log 2(cuHeight)) respectively, and ($N_T$=N; $N_L$=0) or ($N_L$=N; $N_T$=0) respectively.

2.5 Fifth Embodiment: Two Sample Sets not Available

The fourth embodiment comprises deriving an IC-flag set to false, at the encoding or decoding, in case the left-samples are not available and the top-samples are not available. A variant of the fourth embodiment comprises deriving an IC-flag set to false, at the encoding or decoding, in case the block width is lower than a first value and in case the block height is lower than a second value. Another variant of the fourth embodiment comprises deriving an IC-flag set to false, at the encoding or decoding, in case the block width is greater than a first value and in case the block height is greater than a second value.

Advantageously, this embodiment allows to improve compression efficiency as the IC flag is inferred and it is not coded in the bit-stream.

In a variant, if both "left-samples" and "top-samples" are un-available, then IC-flag is inferred to false in a step 320 and it is not coded in the bit-stream.

In a variant, if one sample set (top or left) is not available and the other (left or top respectively) dimension size is below (or above) a threshold, then IC-flag is inferred to false and it is not coded in the bit-stream.

According to IC derivation variant, entropy coding and entropy decoding are also modified so that LIC parameter flags are not coded for CUs not using LIC.

2.6 Sixth Embodiment Adapted to Non-Rectangular Case

The sixth embodiment comprises selecting samples which are spatially contiguous to a PU triangle for deriving the LIC parameters in case of triangle prediction. A variant of the sixth embodiment comprises selecting samples which are spatially contiguous to a PU triangle for deriving the LIC parameters according to triangle partition orientation.

A variant of the sixth embodiment comprises coding/decoding 2 IC flags, one for each dimension of the block in case of triangle prediction.

Advantageously, this embodiment allows to optimize samples sets in case of triangular CUs by selecting spatially closed samples.

In case of triangle shape prediction unit (see FIG. 6) the samples sets are modified as follows:

Only the samples which are spatially contiguous to the PU triangle are used to derive the LIC parameters. For example, in case of triangle configuration of FIG. 6 (top-left) one uses only "top-samples" set for triangle "a" ($N=N_T$) and only "left-samples" set for the triangle "b" ($N=N_L$). In case of triangle configuration of FIG. 6 (bottom-left) one uses both "top-samples" and "left-samples" sets for triangle "c" and IC-flag is inferred to be false for the triangle "d".

In a variant, two IC-flags are coded, one for each PU. In case of triangle "d", no IC-flag is coded.

The same policy may apply for the 4 non-rectangular partitioning of FIG. 5 top-right, where only the samples pertaining to the dimension where PU size and CU size are the same are kept. It means that the non-rectangular PU partitioning 3 and 5 will have same sample sets as PU triangles of 1, and the non-rectangular PU partitioning 4 and 6 will have same sample sets as PU triangles of 2.

In a variant, the two sample sets are composed of samples which are contiguous to the non-rectangular PUs only.

According to 2 IC flags variant, entropy coding and entropy decoding are also modified so that LIC parameter flags are coded for CUs not using 2 flags.

2.7 Seventh Embodiment Adapted to Multi-Hypothesis Case

The seventh embodiment comprises, in case of multi-hypothesis prediction, selecting samples which are spatially contiguous to the regions with a blending weight that is superior or equal to a value for deriving the LIC parameters.

Advantageously, this embodiment allows to optimize samples sets in case of multi-hypothesis predicted CUs by selecting reference samples with higher weight.

The samples sets are composed of samples which are contiguous to the regions with values of w_inter that is superior or equal to a threshold. The threshold value may be zero.

Figure 7:
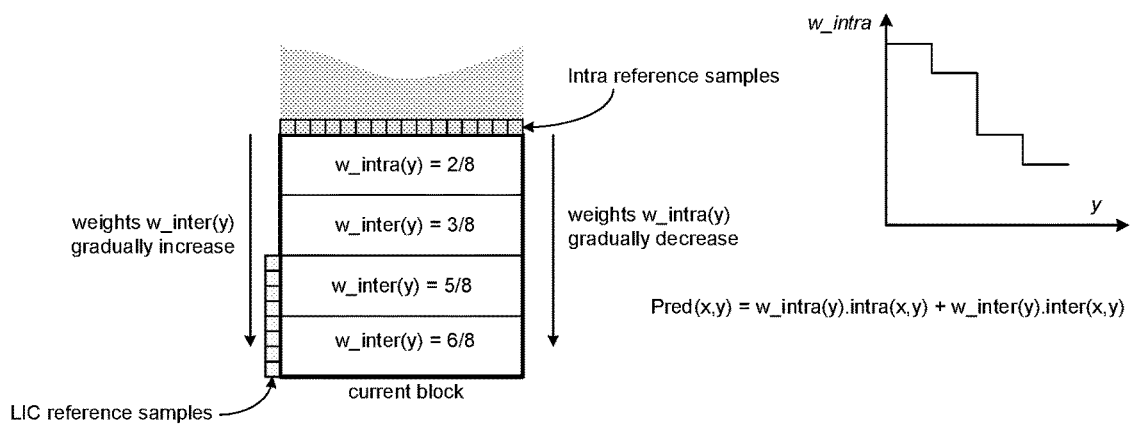
FIG. 7 illustrates examples of multi-hypothesis prediction in case of inter and intra modes combination in prior art.

In FIG. 7 is depicted an example where the intra prediction direction is vertical and the value of "threshold" is 0.5 which turns out in using a subset of bottom-left reference samples to derive LIC parameters. One can derive same example with intra prediction direction is horizontal, using a subset of top-right reference samples to derive LIC parameters.

In a variant, LIC is always disabled for MH if the intra mode is DC. In a variant, LIC is always disabled for MH if the intra mode is Planar. In a variant, LIC is always disabled with MH.

2.8 Eighth Embodiment Adapted to QTBT Partioning

Figure 11:
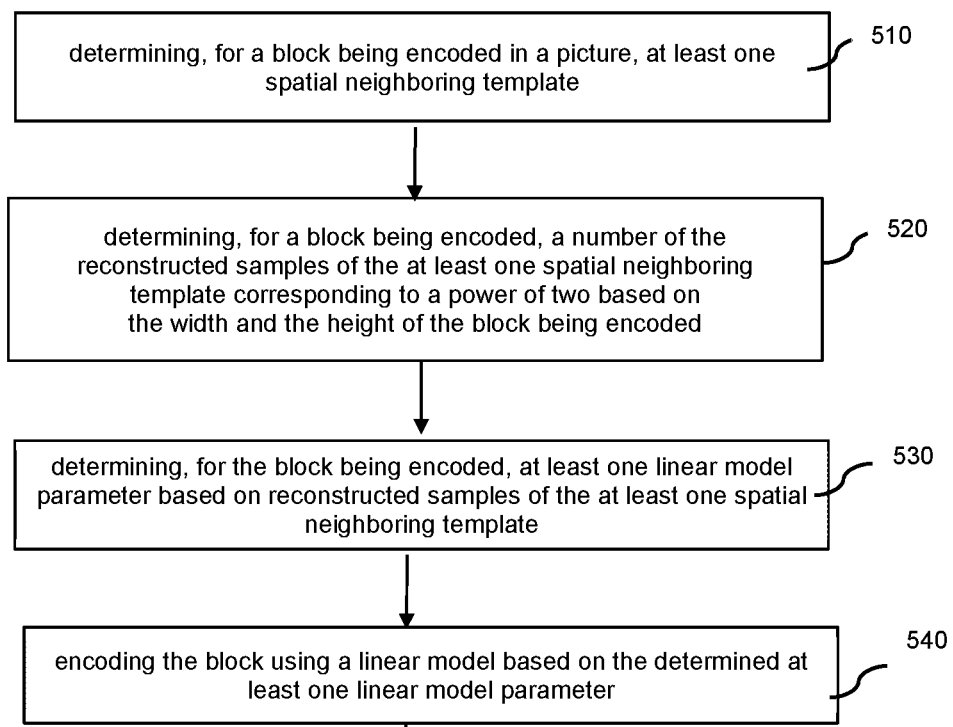
FIG. 11 illustrates an example encoding method according to a general aspect of at least one embodiment.

FIG. 11 illustrates an exemplary encoding method 500 according to a general aspect of at least one embodiment. As explained for exemplary embodiments as the cross-component linear model (CCLM) prediction mode or the Local Illumination Compensation (LIC), the method 500 determines at least one linear model parameter based on reconstructed samples of at least one spatial neighboring template of the block being encoded. Such linear model parameter comprises for instance an affine coefficient of the model as defined in equation 3, or 6. Thus a linear model belongs to a set comprising cross-component linear model; block-based illumination compensation linear model; bi-directional optical flow. The embodiment of FIG. 11 is a particular implementation of the embodiment of FIG. 1 for an encoding method.

Figures 10A, 10B:
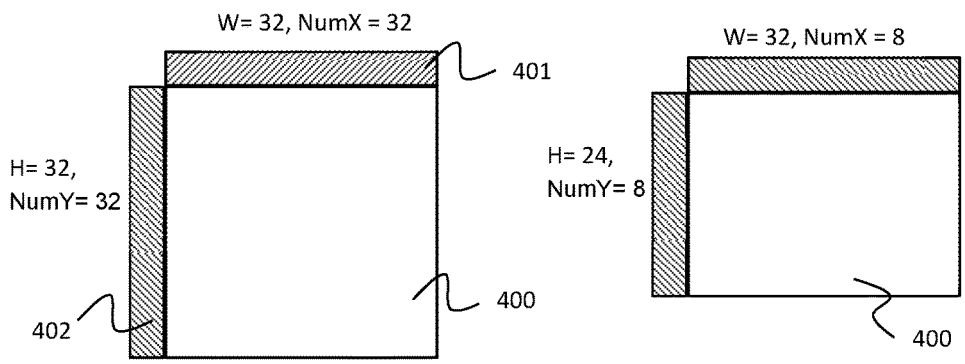
FIGS. 10A, 10B, 10C and 10D are pictorial examples depicting the number of the reconstructed samples of the at least one spatial neighboring template according to a general aspect of at least one embodiment.

In the present embodiment, the following variables are defined: H (cuHeight) representing the height of the block being processed; W (cuWidth) representing the width of the block being processed; the total number N of samples in the template with $N=2^k=NumY+NumX$ where NumY, NumX ($N_L$, $N_T$) respectively represents the number of samples in the left and top templates; and Ystep and Xstep respectively represents the subsampling step in the left and top neighboring First, at 510, the method 500 determines, for a block being encoded in a picture, at least one spatial neighboring template. As shown on FIG. 10A to 10D, according to various block partitioning, the spatial neighboring template 401, 402 is of various size. FIG. 10A illustrates the case where the block 400 being encoded is a square block with width W and height H being a power of two, for instance W=H=32. The unit of width W and height H is the image sample. Thus, the two neighboring templates 401, 402 of reconstructed samples are determined for the block 400. The size of the top neighboring template 401 is 32×1 samples and the size of the left neighboring template is 1×32 samples. The skilled in the art will appreciate that depending of the position of the block in the image and of the scanning order in the decoding, the block being encoded or decoded has zero (for the first block for of an image), one (left or top neighboring) or two neighboring templates of reconstructed pixels. Besides, the skilled in the art will notice that a spatial neighboring template 401, 402 comprises each neighboring sample of the block being processed among a line 401 of top neighboring samples, and a line 402 of left neighboring samples. The various embodiments exposed for the general case with top and left templates are easily adapted for the case with only one neighboring template being top or left. At 520, the method 500 determines, for a block being encoded, a number of the reconstructed samples of the at least one spatial neighboring template corresponding to a power of two based on the width and the height of the block being encoded. Thus, for the exemplary case of FIG. 10A, the number NumX of the reconstructed samples of the top neighboring template and the number NumY of the reconstructed samples of the left neighboring template are set to $32=2^5$. At 530, the method 500 determines, for the block being encoded, at least one linear model parameter based on reconstructed samples of the at least one spatial neighboring template. Indeed, the method selects the determined number NumX and NumY of samples among the neighboring samples to perform the processing resulting in the linear model. For instance, a linear model parameter is an affine coefficient as defined in equation 3 or 6 responsive to the values of the Numx and NumY reconstructed samples in the neighborhood. The linear model parameters based on reconstructed samples of the at least one spatial neighboring template are obtained by minimizing a distortion between samples of the spatial neighboring template of the block being encoded or decoded and samples of the spatial neighboring template of a reference block for the block being encoded or decoded. The division by $2^5$ in the equations solving the minimization can simply implemented by a right shift. Finally, at 540, the method 500 encodes the block using a linear model based on the determined at least one linear model parameter such as exposed for CCLM or LIC.

FIG. 10A illustrates an example where the block size, and thus the number of reconstructed samples used in the linear model computation is natively of power of two and equal for left and top neighborhood. Thus, the known determining of linear model parameter is well adapted to this partition. However, FIGS. 10B, 10C and 10D illustrates examples where the determining of linear model parameter lead to inaccurate, hence sub-optimal, computation.

FIG. 10B illustrates the case where the block 400 being encoded is a rectangular block with height H being $3\times2^N$, namely H=24 and W=32. According to one embodiment exposed in FIG. 13, the number NumX of reconstructed samples of the top neighboring template and the number NumY of reconstructed samples of the left neighboring template are set to $8=2^3$. In two words, the samples of the left template are subsampled to keep 1 out of 3 samples, ie 24/3=8, the samples of the top template are subsampled to keep 1 out of 4 so that the number NumX of reconstructed samples of the top neighboring template and the number NumY of reconstructed samples of the left neighboring template used in linear model computation are equal and set to 8.

Figures 10C, 10D:
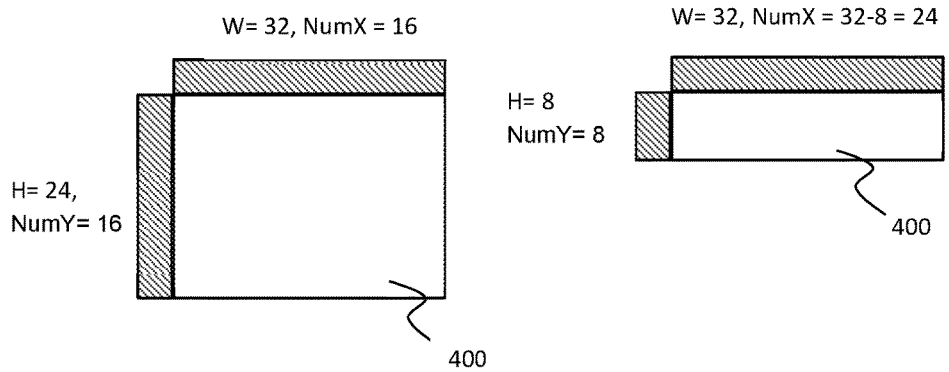

FIG. 10C illustrates another embodiment in the case where the block 400 being encoded is a rectangular block with height H being $3\times2^N$, namely H=24 and W=32. According to one embodiment exposed in FIG. 14, the number NumX of reconstructed samples of the top neighboring template and the number NumY of reconstructed samples of the left neighboring template are set to $16=2^4$. In two words, the samples of the left template are subsampled to keep 2 out of 3 samples, ie 24*2/3=16, the samples of the top template are then subsampled to keep 1 out of 2 so that the number NumX of reconstructed samples of the top neighboring template and the number NumY of reconstructed samples of the left neighboring template used in linear model computation are equal and set to 16.

FIG. 10D illustrates the case where the block 400 being encoded is a rectangular block with one dimension much smaller than the other, namely H=8 and W=32. According to one embodiment exposed in FIG. 9, the sum of number NumX of reconstructed samples of the top neighboring template and the number NumY of reconstructed samples of the left neighboring template are set to $32=2^8$. In two words, the samples of the left template being the smallest are kept in the computation and their number NumY=8 are removed from the number of the samples of the top template to keep NumX=32−8=24 samples in the top template so that the sum number NumX=24 of the reconstructed samples of the top neighboring template and the number NumY=8 of the reconstructed samples of the left neighboring template used in linear model computation are equal and set to 32.

Figure 12:
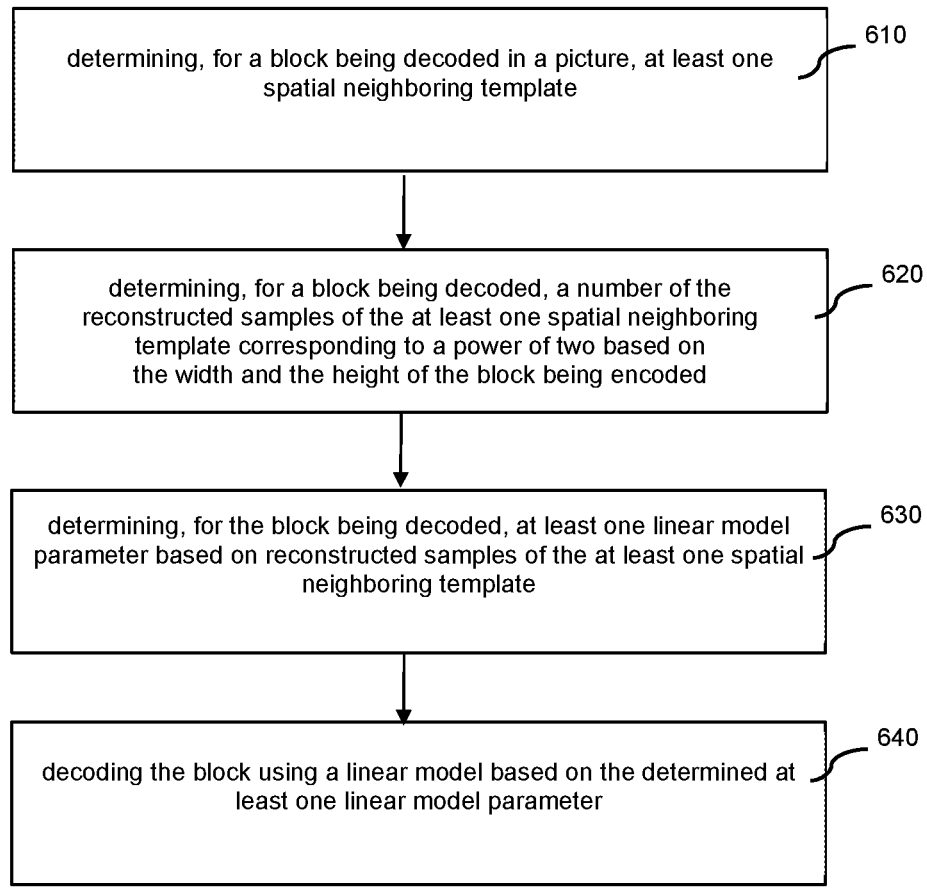
FIG. 12 illustrates an example of a decoding method according to a general aspect of at least one embodiment.

FIG. 12 illustrates an example of a decoding method according to a general aspect of at least one embodiment. The skilled in the art will appreciate that the same principles apply to the encoding method 500 and to the decoding method 700. The embodiment of FIG. 12 is also a particular implementation of the embodiment of FIG. 1. Accordingly, the method 600 determines at least one linear model parameter based on reconstructed samples of at least one spatial neighboring template of the block being decoded. Such linear model parameter is for instance an affine coefficient of the model as defined in equation 3 or 6. First, at 610, the method 600 determines, for a block being decoded in a picture, at least one spatial neighboring template as illustrated with exemplary embodiments of FIG. 10A to 10D. Thus, 2 neighboring templates 401, 402 of reconstructed samples are determined for the block 400. The size of the top neighboring template 401 is W×1 samples and the size of the left neighboring template is 1×H samples. At 620, the method 600 determines, for a block being decoded, a number of reconstructed samples of the at least one spatial neighboring template corresponding to a power of two based on the width and the height of the block being decoded. Thus, for the exemplary case of FIG. 10A, the number NumX of reconstructed samples of the top neighboring template and the number NumY of reconstructed samples of the left neighboring template are set to 32=2^5. Naturally, the number NumX of reconstructed samples of the top neighboring template and the number NumY of reconstructed samples of the left neighboring template are also determined according to various embodiment as illustrated with FIG. 10B-10D. At 630, the method 600 determines, for the block being decoded, at least one linear model parameter based on reconstructed samples of the at least one spatial neighboring template. For instance, the affine coefficients as defined in equation 3 or 6 are computed based on the values of NumX and NumY reconstructed samples in the neighborhood. The division by 2^5 for the exemplary example of FIG. 10A in the equations can simply be implemented by a right shift. Finally, at 640, the method 600 decodes the block using a linear model based on the determined at least one linear model parameter such as exposed for CCLM or LIC.

Figure 13:
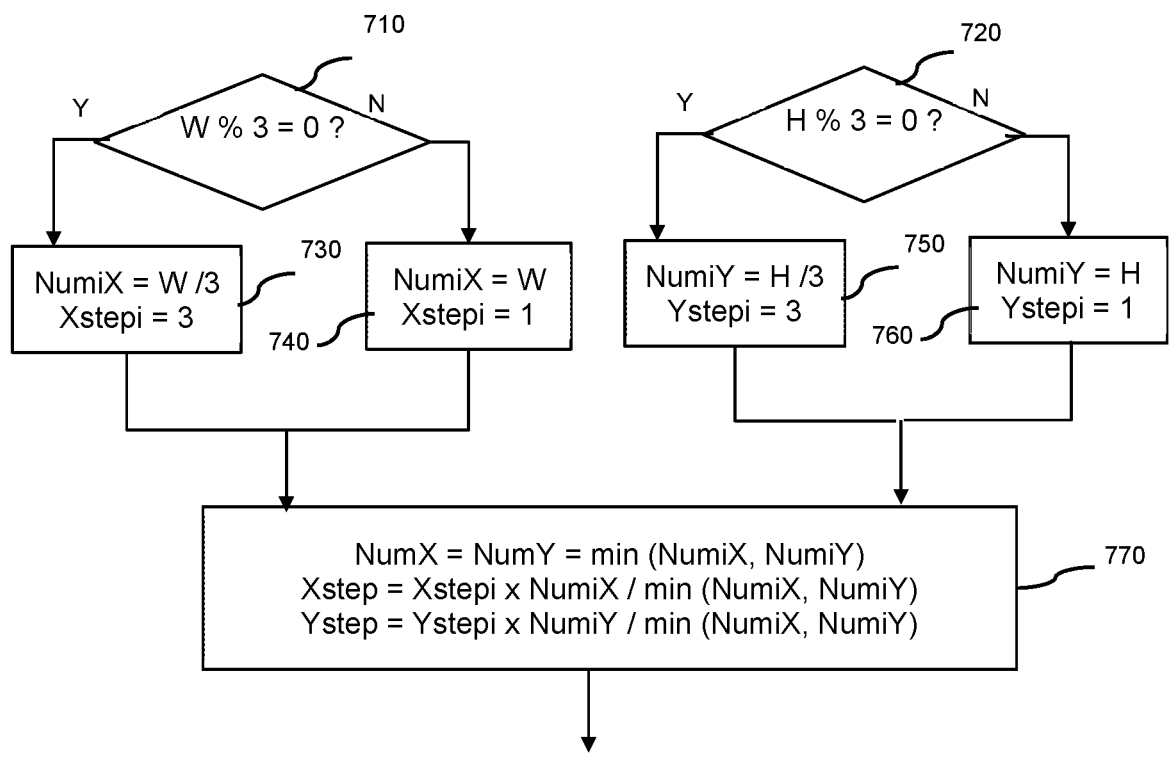
FIGS. 13, 14, 15 and 16 illustrate various example of the determining of number of the reconstructed samples method according to a general aspect of at least one embodiment.

FIG. 13 illustrates an exemplary detail of the determining 520, 620 of the number of the reconstructed samples of the encoding method 500 or of the decoding method 600 according to an aspect of at least one embodiment particularly adapted when the neighboring block has at least a dimension of 3×2^N. The skilled in the art, will appreciate that this case occurs considering the asymmetric Coding Units in QTBT, where either width W, or height H or both W, H is of size 3×2^N. According to this embodiment, the samples of the templates are successively subsampled to keep 1 sample out of 3 (NumiX, NumiY) and to keep a same number in both templates (NumX, NumY). Thus, at 710, the width W is tested to check if it is a multiple of 3, W % 3=0 ?, where % represents the modulo operator. In case where the width of the block being encoded or decoded is a multiple of 3 (branch Y), W=3×2^N, the determined number of reconstructed samples NumiX of a top spatial neighboring template is divided by 3 at 730. In other words, the number of reconstructed samples NumiX corresponds to the width of the block being processed divided by 3, NumiX=W/3. According to a variant, instead of determining the number of reconstructed samples NumiX, a subsampling step Xstepi is determined, Xstepi=3. In case where the width of the block being processed is a not multiple of 3 (branch N), then according to the considered block partition the width of the block being processed is a power of 2 (W=2^N), the determined number of reconstructed samples NumiX of a top spatial neighboring template is keep unchanged, i.e. set to W at 740. According to the variant of the subsampling, the subsampling step Xstepi is set to 1, Xstepi=1.

The same process is respectively applied to the height H of the block at 720, 750 and 760. At 720, the height H is tested to check if it is a multiple of 3. In case where the height of the block being processed is a multiple of 3 (branch Y), H=3×2^N, the determined number of reconstructed samples NumiY of the left spatial neighboring template is divided by 3 at 750. In case where the height H of the block being processed is a not multiple of 3 (branch N), the determined number of reconstructed samples NumiY of a left spatial neighboring template is keep unchanged, i.e. set to H at 760. Of course, in a preliminary step not represented on FIG. 7, the existence of a top spatial neighboring template and of a left spatial neighboring template are checked and the method may easily be adapted to the existing spatial neighboring template for instance by setting the value of W or H to 0 in case the absence of causal block.

S Then at 770, the number of samples NumY in the left spatial neighboring template and the number of samples NumX in the top spatial neighboring template are normalized to keep a same number in both templates. In case the width of the block being processed is not equal to the height of the block being processed, the determined number of reconstructed samples of the top spatial neighboring template and the determined number of reconstructed samples of the left spatial neighboring template are set to a same value being a power of two corresponding to the smallest dimension of the block being processed. Implemented in this embodiment, the intermediate numbers NumiX and NumiY are tested at 770 to check if a same number of samples can be used in top and left neighborhood to compute the linear model parameters. The determined number of reconstructed samples NumX of a top spatial neighboring template is set to the minimum value of the intermediate numbers NumiX and NumiY. According to the variant of the subsampling, the intermediate subsampling step Xstepi is multiplied by the ratio NumiX/min (NumiX, NumiY), thus Xstep=Xstepi× NumiX/min (NumiX, NumiY). Besides, the determined number of reconstructed samples NumY of a left spatial neighboring template is set to the minimum value of the intermediate number NumiX and NumiY. According to the variant of the subsampling, the intermediate subsampling step Ystepi is multiplied by the ratio NumiY/min (NumiX, NumiY), thus Ystep=Ystepi×NumiX/min (NumiX, NumiY). The subsampling step is used to determine in the step 530 of the encoding method or in the step 630 of the decoding method that respectively 1 sample out Xstep samples for a top template or 1 sample out Ystep samples for left template are used in the computation for determining the linear model parameter. The selected samples can be regularly distributed along the template or only first one is kept. Any selection of the number of samples is compatible with the present principles. The skilled in the art will appreciate that the values Step and Num are redundant and that only one of the 2 values might be determined in the present embodiments.

Thus, the embodiment of FIG. 13 combines 2 features, the normalization for block of size 3×2^N and the normalization to have a same number in both spatial neighboring template. An example of such embodiment is illustrated on FIG. 10B. With W=32 and H=24, after the step 740 and 750, NumiX=32 (Ystepi=1) and NumiY=8 (Ystepi=3) and finally after step 770, NumX=8 (Xstep=4) and NumY=8 (Ystep=3).

Therefore, the present inventors have recognized the potential advantages in several ways to improve the computation of a linear model parameter by determining a number of samples being a power of 2 using any of the block partition of the existing JEM codecs.

Figure 14:
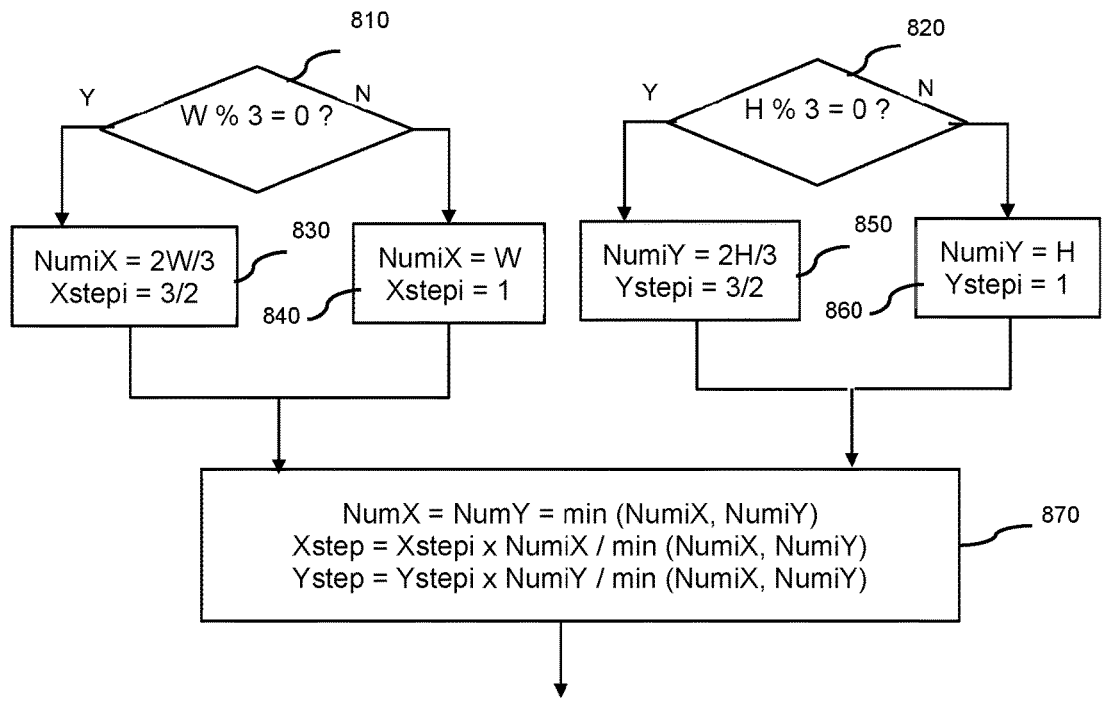

FIG. 14 illustrates an exemplary detail of the determining 520, 620 of number of the reconstructed samples of the encoding method 500 or of the decoding method 600 according to another embodiment adapted to the case where the neighboring block has at least a dimension of 3×2^N. According to this embodiment, the samples of the templates are subsampled to keep 2 sample out of 3 (NumiX, NumiY) and to keep a same number in both templates (NumX, NumY). Thus, at 810, the width W is tested to check if it is a multiple of 3, W % 3=0 ?, where % represents the modulo operator. In case where the width of the block being encoded or decoded is a multiple of 3 (branch Y), W=3×2^N, the determined number of reconstructed samples NumiX of a top spatial neighboring template is multiplied by 2/3 at 830.

In other words, the number of reconstructed samples NumiX corresponds to the width of the block being processed multiplied by 2/3, NumiX=2×W/3. According to the variant of subsampling, the subsampling step Xstepi is set to 3/2. In case where the width of the block being processed is a not multiple of 3 (branch N), then according to considered block partition the width of the block being processed is a power of 2 (W=2^N), the determined number of reconstructed samples NumiX of a top spatial neighboring template is keep unchanged, i.e. set to W at 840. According to the variant of the subsampling, the subsampling step Xstepi is set to 1.

The same process is respectively applied to the height H of the block at 820, 850 and 860. At 820, the height H is tested to check if it is a multiple of 3. In case where the height of the block being processed is a multiple of 3 (branch Y), H=3×2^N, the determined number of reconstructed samples NumiY of the left spatial neighboring template is multiplied by 2/3 at 850. In case where the height H of the block being processed is a not multiple of 3 (branch N), the determined number of reconstructed samples NumiY of a left spatial neighboring template is keep unchanged, i.e. set to H at 860. Then at 870, the number of samples NumY in the left spatial neighboring template and the number of samples NumX in the top spatial neighboring template are normalized to keep a same number in both templates as described for FIG. 7. In case the width of the block being processed is not equal to the height of the block being processed, the determined number of reconstructed samples of the top spatial neighboring template and the determined number of reconstructed samples of the left spatial neighboring template are set to a same value being a power of two corresponding to the smallest dimension of the block being processed. Implemented in this embodiment, the intermediate numbers NumiX and NumiY are tested at 870 to check if a same number of samples can be used in top and left neighborhood to compute the linear model parameters. The determined number of reconstructed samples NumX of a top spatial neighboring template, respectively NumY of a left spatial neighboring template is set to the minimum value of intermediate number NumiX and NumiY.

Thus, the embodiment of FIG. 14 combines 2 features, the normalization by 2/3 for block of size 3×2^N and the normalization to have a same number in both spatial neighboring template. An example of such embodiment is illustrated on FIG. 4C. With W=32 and H=24, after the step 840 and 850, NumiX=32 (Xstepi=1) and NumiY=16 (Ystepi=3/2) and finally after step 870, NumX=16 (Xstep=2) and NumY=16 (Ystep=3/2).

Therefore, such embodiment increases the number of samples used the computation of a linear model parameter compared to the previously described embodiment thus improving the accuracy of the model.

Figure 15:
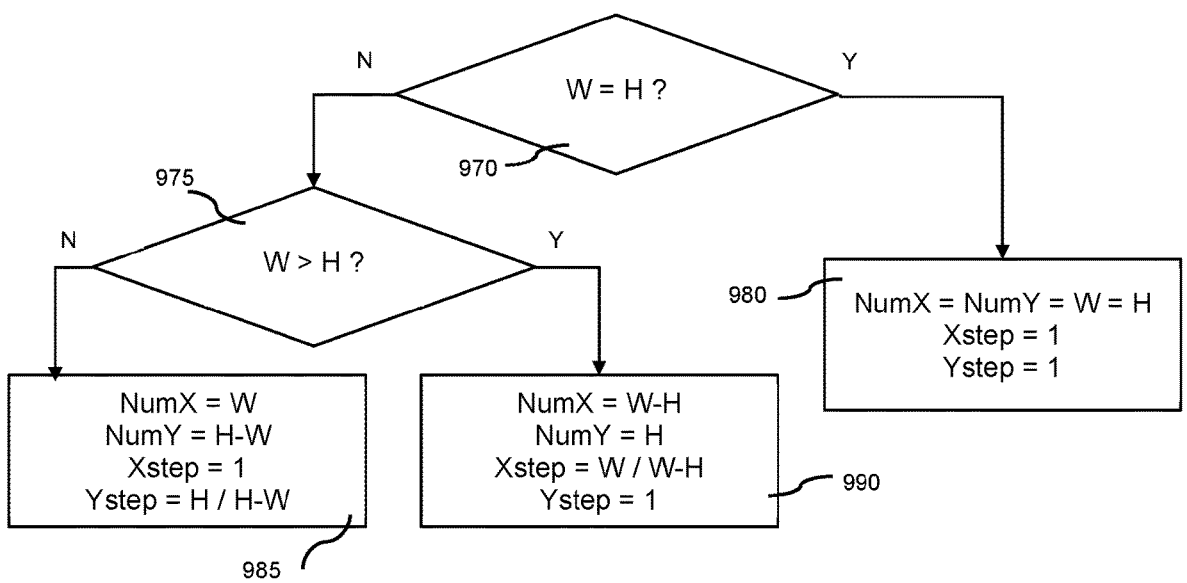

FIG. 15 illustrates an exemplary detail of the determining 520, 620 of number of the reconstructed samples of the encoding method 500 or of the decoding method 600 according to another embodiment adapted to the case where the neighboring block has at least a non-square dimension, in particular when one dimension is much larger than the other. However, this embodiment also solves the issue raised by a block with one dimension (the smallest dimension) not being equal to a power of two. This embodiment is presented without the features of normalization for block of size 3×2^N but of course both features are compatible as shown in FIG. 16.

Thus at 970, the number of samples NumY in the left spatial neighboring template and the top spatial neighboring template NumX are tested to check if there is a same number in both templates. In case the width of the block being processed is equal (branch Y) to the height of the block being processed, the block is square and the determined number of reconstructed samples of the top spatial neighboring template and the determined number of reconstructed samples of the left spatial neighboring template are set to a same value being a power of two corresponding to the height and width at 980. No subsampling is required and Xstep, Ystep are set to 1. In case the width of the block being processed is not equal (branch N) to the height of the block being processed, then the sum of the determined number NumX of reconstructed samples of a top spatial neighboring template and of the determined number NumY of reconstructed samples of a left spatial neighboring template is set to a power of two corresponding to the largest dimension of the block being encoded or decoded. To that end, the largest value is tested at 975. In case the block width is larger than the block height (branch Y), at 990, the determined number of reconstructed samples of the left spatial neighboring template NumY is set to H being the smallest dimension of the block and, the number of reconstructed samples of the top spatial neighboring template NumX is set to W–H so that the sum NumX+NumY is equal to a power of two corresponding to the largest dimension of the block being encoded or decoded. Accordingly, for the variant of subsampling, Xstep is set to W/W–H (W–H out of W sample are used) and Ystep is set to 1 (all samples are used, 1 out of 1). In the other case (branch N) where the block width is smaller than the block height (branch N), at 985, the determined number of reconstructed samples of the top spatial neighboring template NumX is set to W being the smallest dimension of the block and, the number of reconstructed samples of the left spatial neighboring template NumY is set to H–W. Accordingly, for the variant of subsampling, Xstep is set to 1 and Ystep is set to H/H–W.

Figure 16:
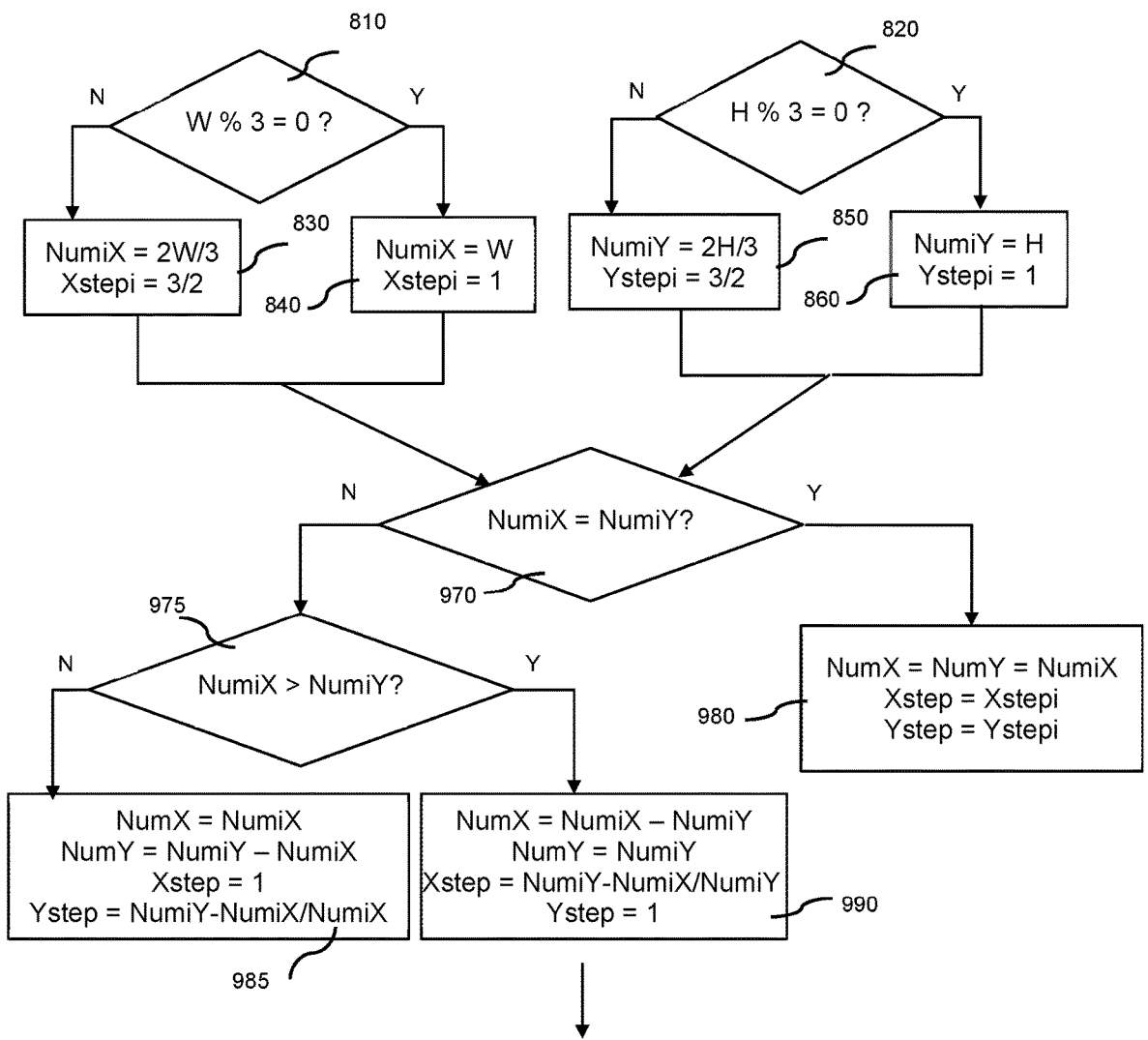

Thus, the embodiment of FIG. 16 maximizes the number of samples in the computation of the linear model in particular when width and height are quite different. As illustrated by the example of FIG. 10D. With W=32 and H=8, after the step 970, NumX=32 –8=B and NumY=8 while the embodiment of FIG. 13, the number of used samples would be NumX=NumY=8, resulting in 16 total samples used instead of 32 in the present embodiment. Besides, it should be highlighted that with the present embodiment, a more important relative weight is given to the neighboring template of the larger dimension, for instance to NumX=24 compared to NumY=8 as described in section 2.3. Such embodiment thus improves the accuracy of the model since the weight of the larger template is increased in the linear model computation.

FIG. 16 illustrates an example of the determining of number of the reconstructed samples method according to a general aspect of at least one embodiment. The embodiment of FIG. 16 combines the 2 features, the normalization for block of size 3×2^N and the normalization to have the sum of the numbers in both spatial neighboring template being a power of two.

The samples of the templates are subsampled to keep 2 sample out of 3 (NumiX, NumiY) at 830 and 850. Thus, at 810, the width W is tested to check if it is a multiple of 3, W % 3=0 ?. In case where the width of the block being encoded or decoded is a multiple of 3 (branch Y), W=3×2^N, the determined number of reconstructed samples NumiX of a top spatial neighboring template is multiplied by 2/3 at 830. According to the variant of subsampling, the subsampling step Xstepi is set to 3/2. In case where the width of the block being processed is a not multiple of 3 (branch N), then according to considered block partition the width of the block being processed is a power of 2 (W=2^N), the determined number of reconstructed samples NumiX of a top spatial neighboring template is keep unchanged, i.e. set to W at 1040. According to the variant of the subsampling, the subsampling step Xstepi is set to 1. The same process is respectively applied to the height H of the block at 820, 850 and 860.

Then, at 970, the resulting number of samples is tested check whether there exist a larger dimension NumXi=NumYi ?. In case the numbers NumXi and NumYi of samples after the first regularization are equal (branch Y), then the determined number NumX of reconstructed samples of a top spatial neighboring template and of the determined number NumY of reconstructed samples of a left spatial neighboring template are equal and set to a power of two at 980. In case the numbers NumXi and NumYi of samples after the first regularization are not equal (branch N), then the sum of the determined number NumX of reconstructed samples of a top spatial neighboring template and of the determined number NumY of reconstructed samples of a left spatial neighboring template is set to a power of two corresponding to the largest dimension of the template after the first regularization. To that end, the largest value is tested at 975. In case the determined number of reconstructed samples NumiX of a top spatial neighboring is larger than the determined number of reconstructed samples NumiY of a left spatial neighboring t (branch Y), at 990, the determined number of reconstructed samples of the left spatial neighboring template NumY is set to NumiY and the number of reconstructed samples of the top spatial neighboring template NumX is set to NumiX-NumiY so that the sum NumX+NumY is equal to a power of two corresponding to the largest dimension of the templates after the first subsampling. In the other case (branch N), at 985, the determined number of reconstructed samples of the top spatial neighboring template NumX is set to NumiX and, the number of reconstructed samples of the left spatial neighboring template NumY is set to NumiY-NumiX.

3 ADDITIONAL EMBODIMENTS AND INFORMATION

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 17:
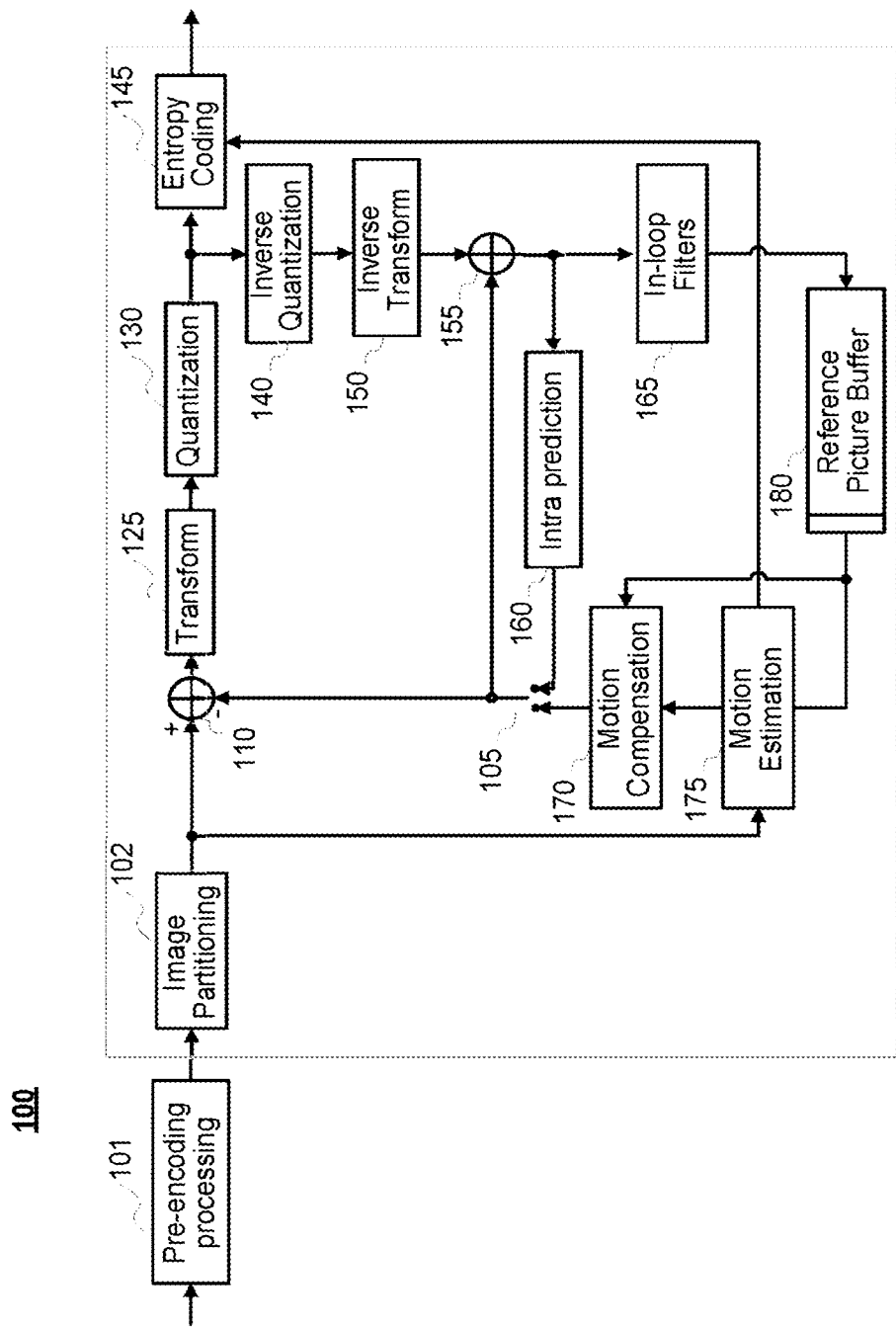
FIG. 17 illustrates a block diagram of an embodiment of video encoder in which various aspects of the embodiments may be implemented.
Figure 18:
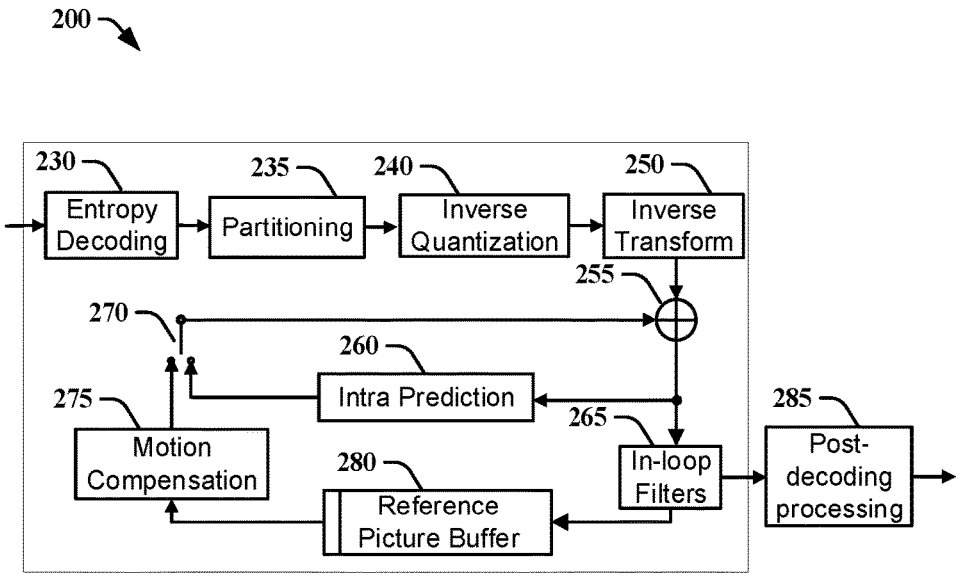
FIG. 18 illustrates a block diagram of an embodiment of video encoder in which various aspects of the embodiments may be implemented.
Figure 19:
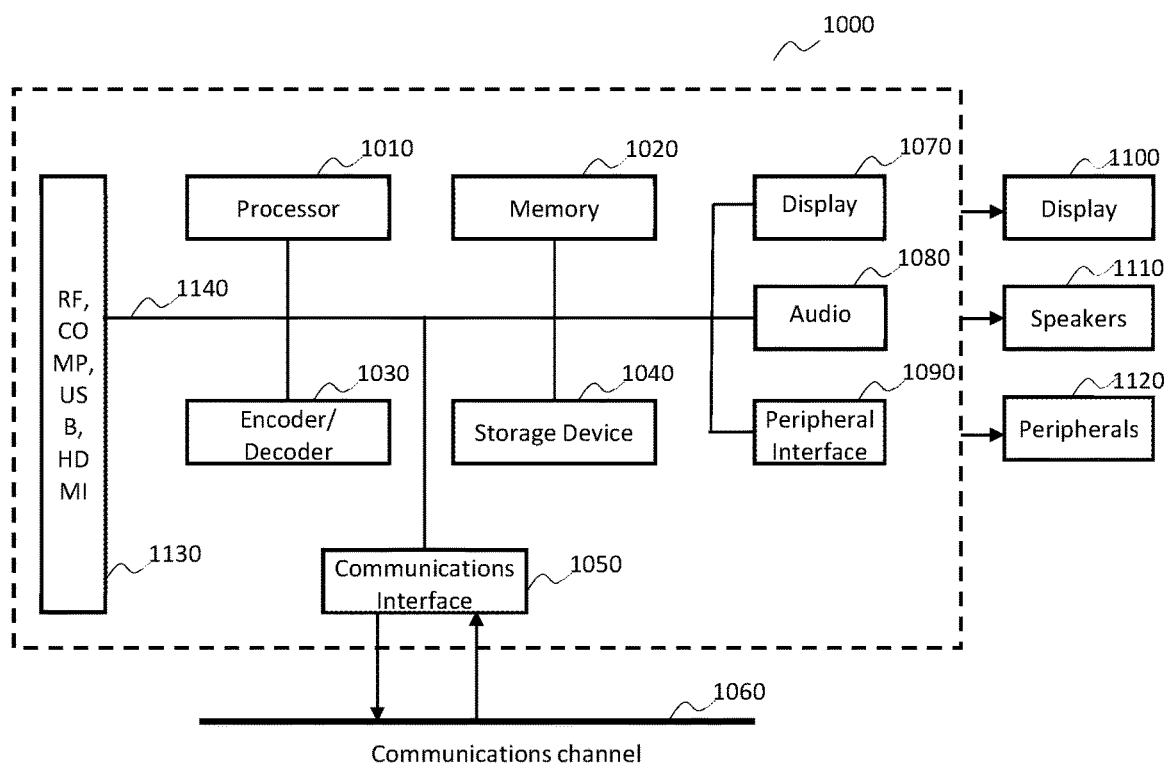
FIG. 19 illustrates a block diagram of an example apparatus in which various aspects of the embodiments may be implemented.

The aspects described and contemplated in this application can be implemented in many different forms. FIGS. 17, 18 and 19 below provide some embodiments, but other embodiments are contemplated and the discussion of FIGS. 17, 18 and 19 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the motion compensation (170, 275), motion estimation (175), entropy coding, intra (160,260) and/or decoding modules (145, 230), of a video encoder 100 and decoder 200 as shown in FIG. 17 and FIG. 18. Moreover, the present aspects are not limited to WC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values are used in the present application, for example. The specific values are for example purposes and the aspects described are not limited to these specific values.

FIG. 17 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 18 illustrates a block diagram of a video decoder 200. In the decoder 200, a bitstream is decoded by the decoder elements as described below. Video decoder 200 generally performs a decoding pass reciprocal to the encoding pass as described in FIG. 17. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 19 illustrates a block diagram of an example of a system in which various aspects and embodiments are implemented. System 1000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 10, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a W-Fi network, for example IEEE 802.11 (IEEE refers to the Institute of Electrical and Electronics Engineers). The Wi-Fi signal of these embodiments is received over the communications channel 1060 and the communications interface 1050 which are adapted for W-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or other device. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, determining samples used for deriving Local Illumination Compensation parameters, said determining being based on block geometry, coding mode and size and determining temporal prediction for the block using Local illumination Compensation with derived parameters.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application, for example, for example, determining samples used for deriving Local Illumination Compensation parameters, said determining being based on block geometry, coding mode and size and determining temporal prediction for the block using Local illumination Compensation with derived parameters.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein, for example, LIC flag, are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of parameters for region-based parameter selection for LIC. For instance, the enabling/disabling LIC may depends on the size of the region. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments. Features of these embodiments can be provided alone or in any combination, across various claim categories and types. Further, embodiments can include one or more of the following features, devices, or aspects, alone or in any combination, across various claim categories and types:

Modifying the Local Illumination Compensation used in inter prediction process applied in the decoder and/or encoder.

Modifying the derivation of Local Illumination Compensation parameters used in inter prediction process applied in the decoder and/or encoder.

Adapting the determining of samples used in Local Illumination Compensation to the new coding (prediction) modes.

Adapting the determining of samples used in Local Illumination Compensation to the CU geometry, coding mode and size.

Adapting the number n of samples used in LIC wherein $n=2^k$ with k chosen so that n is the maximum integer smaller than the sum of the block width and block height.

Determining an offset for the relative position of the first sample in the top-samples set and/or determining an offset for the relative position of the first sample in the left-samples set.

Selecting a higher number of samples in the larger dimension of the block.

Selecting samples which have been reconstructed using particular coding modes or using particular coding parameters. Deriving an IC-flag set to false, at the encoder or decoder, in case the left-samples are not available. and the top-samples are not available.

Deriving an IC-flag set to false, at the encoding or decoding, in case the block width is lower than a first value and in case the block width is lower than a second value.

Coding and/or decoding 2 IC flags, one for each dimension of the block in case of triangle prediction.

Enabling or disabling illumination compensation methods in the decoder and/or encoder.

Inserting in the signalling syntax elements that enable the decoder to identify the illumination compensation method to use.

Selecting samples which are spatially contiguous to a PU triangle for deriving the LIC parameters in case of triangle prediction.

Selecting samples for deriving the LIC parameters according to the triangle partition orientation.

In case of multi-hypothesis prediction, selecting samples which are spatially contiguous to the regions with a blending weight that is superior or equal to a value for deriving the LIC parameters.

Selecting, based on these syntax elements, the QP prediction method to apply at the decoder.

Applying the method for deriving the LIC parameters at the decoder.

A bitstream or signal that includes one or more of the described syntax elements, or variations thereof.

A bitstream or signal that includes syntax conveying information generated according to any of the embodiments described.

Inserting in the signaling syntax elements that enable the decoder to adapt LIC in a manner corresponding to that used by an encoder.

Creating and/or transmitting and/or receiving and/or decoding a bitstream or signal that includes one or more of the described syntax elements, or variations thereof.

Creating and/or transmitting and/or receiving and/or decoding according to any of the embodiments described.

A method, process, apparatus, medium storing instructions, medium storing data, or signal according to any of the embodiments described.

A TV, set-top box, cell phone, tablet, or other electronic device that performs adaptation of LIC parameters according to any of the embodiments described.

A TV, set-top box, cell phone, tablet, or other electronic device that performs adaptation of LIC parameters according to any of the embodiments described, and that displays (e.g. using a monitor, screen, or other type of display) a resulting image.

A TV, set-top box, cell phone, tablet, or other electronic device that selects (e.g. using a tuner) a channel to receive a signal including an encoded image, and performs adaptation of LIC parameters according to any of the embodiments described.

A TV, set-top box, cell phone, tablet, or other electronic device that receives (e.g. using an antenna) a signal over the air that includes an encoded image, and performs adaptation of LIC parameters according to any of the embodiments described.

The invention claimed is:

1. A method for video decoding, comprising:
determining, for a block being decoded, a block width and a block height;
if the block width is not equal to the block height and the block width is not equal to half of the block height and the block height is not equal to half of the block width, determining at least one spatial neighboring template comprising a number N of reconstructed samples, wherein N is the maximum integer smaller than the sum of the block width and block height, and wherein $N=2^k$;
determining, for the block being decoded, at least one linear model parameter based on the number N of reconstructed samples of the at least one spatial neighboring template; and
decoding the block using a linear model based on the determined linear model parameter.

2. The method of claim 1, wherein determining at least one spatial neighboring template comprises determining an offset for the relative position of a first sample among samples of a left neighboring line of the block being decoded, or determining an offset for the relative position of a first sample among samples of a top neighboring line of the block being decoded.

3. The method of claim 1, the number N of reconstructed samples of the at least one spatial neighboring template is set to the higher number of samples in the larger dimension of the block being decoded.

4. The method of claim 1, further comprising implicitly disabling the linear model, at the decoding, in case the block width is lower than a first value and in case the block height is lower than a second value.

5. The method of claim 1, wherein at least one of said block width and block height is not equal to a power of two.

6. The method of claim 1, wherein the linear model belongs to a set comprising:
cross-component linear model;
block based illumination compensation linear model; and
bi-directional optical flow.

7. A non-transitory processor readable medium having stored therein instructions for causing a processor to perform the method for video decoding according to claim 1.

8. An apparatus for video decoding, comprising one or more processors, and at least one memory and wherein the one or more processors is configured to:
determine, for a block being decoded, a block width and a block height;
if the block width is not equal to the block height and the block width is not equal to half of the block height and the block height is not equal to half of the block width, determine at least one spatial neighboring template comprising a number N of reconstructed samples, wherein N is the maximum integer smaller than the sum of the block width and block height, and wherein $N=2^k$;
determine, for the block being decoded, at least one linear model parameter based on the number N of reconstructed samples of the at least one spatial neighboring template; and
decode the block using a linear model based on the determined linear model parameter.

9. The apparatus of claim 8, wherein determining at least one spatial neighboring template comprises determining an offset for the relative position of a first sample among samples of a left neighboring line of the block being decoded, or determining an offset for the relative position of a first sample among samples of a top neighboring line of the block being decoded.

10. The apparatus of claim 8, wherein the number N of reconstructed samples of the at least one spatial neighboring template is set to the higher number of samples in the larger dimension of the block being decoded.

11. The apparatus of claim 8, further comprising implicitly disabling the linear model, at the decoding, in case the block width is lower than a first value and in case the block height is lower than a second value.

12. The apparatus of claim 8, wherein at least one of said block width and block height is not equal to a power of two.

13. The apparatus of claim 8, wherein the linear model belongs to a set comprising:
cross-component linear model;
block based illumination compensation linear model; and
bi-directional optical flow.

14. A method for video encoding, comprising:
determining, for a block being encoded in a picture, a block width and a block height;
if the block width is not equal to the block height and the block width is not equal to half of the block height and the block height is not equal to half of the block width, determining at least one spatial neighboring template comprising a number N of reconstructed samples, wherein N is the maximum integer smaller than the sum of the block width and block height, and wherein $N=2^k$;
determining, for the block being encoded, at least one linear model parameter based on the number N of reconstructed samples of the at least one spatial neighboring template; and
encoding the block using a linear model based on the determined linear model parameter.

15. The method of claim 14, wherein determining at least one spatial neighboring template comprises determining an offset for the relative position of a first sample among samples of a left neighboring line of the block being encoded, or determining an offset for the relative position of a first sample among samples of a top neighboring line of the block being encoded.

16. The method of claim 14, the number N of reconstructed samples of the at least one spatial neighboring template is set to the higher number of samples in the larger dimension of the block being encoded.

17. The method of claim 14, further comprising implicitly disabling the linear model, at the encoding, in case the block width is lower than a first value and in case the block height is lower than a second value.

18. The method of claim 14, wherein at least one of said block width and block height is not equal to a power of two.

19. The method of claim 14, wherein the linear model belongs to a set comprising:
cross-component linear model;
block based illumination compensation linear model; and
bi-directional optical flow.

20. A non-transitory processor readable medium having stored therein instructions for causing a processor to perform the method for video encoding according to claim 14.

21. An apparatus for video encoding, comprising one or more processors, and at least one memory and wherein the one or more processors is configured to:
determine, for a block being encoded in a picture, a block width and a block height;
if the block width is not equal to the block height and the block width is not equal to half of the block height and the block height is not equal to half of the block width, determine at least one spatial neighboring template comprising a number N of reconstructed samples, wherein N is the maximum integer smaller than the sum of the block width and block height, and wherein $N=2^k$;
determine, for the block being encoded, at least one linear model parameter based on the number N of reconstructed samples of the at least one spatial neighboring template; and
encode the block using a linear model based on the determined linear model parameter.

22. The apparatus of claim 21, wherein determining at least one spatial neighboring template comprises determining an offset for the relative position of a first sample among samples of a left neighboring line of the block being encoded, or determining an offset for the relative position of a first sample among samples of a top neighboring line of the block being encoded.

23. The apparatus of claim 21, wherein the number N of reconstructed samples of the at least one spatial neighboring template is set to the higher number of samples in the larger dimension of the block being encoded.

24. The apparatus of claim 21, further comprising implicitly disabling the linear model, at the encoding, in case the block width is lower than a first value and in case the block height is lower than a second value.

25. The apparatus of claim 21, wherein at least one of said block width and block height is not equal to a power of two.

26. The apparatus of claim 21, wherein the linear model belongs to a set comprising:
cross-component linear model;
block based illumination compensation linear model; and
bi-directional optical flow.

* * * * *